United States Patent
Higgins et al.

(10) Patent No.: US 10,296,937 B2
(45) Date of Patent: May 21, 2019

(54) OPERATING A SENSOR RECORDING MARKETPLACE

(75) Inventors: Chris W. Higgins, Portland, OR (US); Athellina Athsani, San Jose, CA (US); Carrie Burgener, Mountain View, CA (US); Marc Davis, San Francisco, CA (US); Simon P. King, Berkeley, CA (US); Rahul Nair, Sunnyvale, CA (US); Christopher T. Paretti, San Francisco, CA (US)

(73) Assignee: Excalibur IP, LLC, New York, NY (US)

(*) Notice: Subject to any disclaimer, the term of this patent is extended or adjusted under 35 U.S.C. 154(b) by 1447 days.

(21) Appl. No.: 12/493,859

(22) Filed: Jun. 29, 2009

(65) Prior Publication Data

US 2010/0332288 A1   Dec. 30, 2010

(51) Int. Cl.
G06Q 30/02 (2012.01)

(52) U.S. Cl.
CPC ......... *G06Q 30/0242* (2013.01); *G06Q 30/02* (2013.01); *G06Q 30/0246* (2013.01); *G06Q 30/0273* (2013.01)

(58) Field of Classification Search
None
See application file for complete search history.

(56) References Cited

U.S. PATENT DOCUMENTS

| | | | |
|---|---|---|---|
| 5,855,008 A | 12/1998 | Goldhaber et al. | |
| 7,406,199 B2* | 7/2008 | Lindeman | 382/224 |
| 7,599,938 B1* | 10/2009 | Harrison, Jr. | 705/7.29 |
| 2002/0111146 A1* | 8/2002 | Fridman et al. | 455/99 |
| 2003/0046382 A1* | 3/2003 | Nick | 709/224 |
| 2004/0215514 A1 | 10/2004 | Quinlan et al. | |
| 2006/0178918 A1* | 8/2006 | Mikurak | G06Q 10/06 705/7.25 |

(Continued)

OTHER PUBLICATIONS

Amin Ahmadi et al, "A Framework for Comprehensive Analysis of a Swing in Sports Using Low-Cost Inertial Sensors", Nov. 2014, Sensors, 2014 IEEE (Year: 2014).*

(Continued)

*Primary Examiner* — Colleen A Hoar
(74) *Attorney, Agent, or Firm* — Mauriel Kapouytian Woods LLP; Serge Krimnus; James Woods

(57) ABSTRACT

A method and system are provided for targeting specific users with specific requested actions to be performed by the user and verified by any methods on behalf of an advertiser within an Internet display advertising campaign. The system discloses techniques for receiving an advertiser's requested actions and corresponding definitions of what constitutes a satisfaction of the action. The disclosure also details techniques for determining if and when and to what degree a requested action has been completed or satisfied by the targeted user, and details corresponding techniques for compensating the user and any other real or virtual entity who had contributed to the satisfaction of the requested action. The system implements a network of sensors that can aid in the determination of if and when and to what degree a requested action has been completed or satisfied. The network of sensors registers sensor recordings within a specialized sensor recording marketplace.

6 Claims, 18 Drawing Sheets

(56) References Cited

U.S. PATENT DOCUMENTS

2007/0112762 A1      5/2007  Brubaker
2007/0250901 A1*    10/2007  McIntire et al. .............. 725/146
2008/0201386 A1*     8/2008  Maharajh .......... G06F 17/30035
2010/0262464 A1*    10/2010  Monteforte et al. ............ 705/10

OTHER PUBLICATIONS

U.S. Appl. No. 12/493,778, filed Jun. 29, 2009, Higgins, Office Action dated Jan. 19, 2012.
U.S. Appl. No. 12/493,739, filed Jun. 29, 2009, Higgins, Office Action dated Nov. 10, 2011.
U.S. Appl. No. 12/493,778, filed Jun. 29, 2009, Higgins et al.
U.S. Appl. No. 12/493,739, filed Jun. 29, 2009, Higgins et al.

* cited by examiner

US 10,296,937 B2

OPERATING A SENSOR RECORDING MARKETPLACE

FIELD OF THE INVENTION

The present invention relates to online advertising. More particularly, the present invention relates to operating a sensor recording marketplace.

BACKGROUND

The proliferation of Internet activity has generated tremendous growth for advertising on the Internet. Typically, advertisers (e.g. buyers of ad space) and online publishers (sellers of ad space) have agreements with one or more advertising networks (ad networks), which provide for serving an advertiser's banner or ad across multiple publishers, and concomitantly provide for each publisher having access to a large number of advertisers. Ad networks (which may also manage payment and reporting) may also attempt to target certain Internet consumers with particular advertisements to increase the likelihood that the consumer will take an action with respect to the ad. From an advertiser's perspective, effective targeting is important for achieving a high return on investment (ROI).

Online advertising markets exhibit undesirable inefficiencies when buyers and sellers are unable to transact. For instance, although a publisher may be subscribed to many ad networks, and one or more of those ad networks may transact inventory with other ad networks, only one of the ad networks to which the publisher is subscribed will be involved in selling (e.g. auctioning or guaranteeing delivery) a given ad space for the publisher. The publisher, or a gatekeeper used by the publisher, selects or prioritizes which ad network (or advertiser having a direct agreement with the publisher) will serve the impression for a given ad request.

Further, in online display advertising, advertisers may wish to target broad consumer segments (e.g. California consumers) or specific consumer sub-segments (e.g. males of ages 20-34 in California browsing finance pages). Advertisers need the ability to specify succinctly their values for and exposure (e.g. number of ad views) to various consumer segments, from broad to narrow.

Further, certain segments of the user population often provide word-of-mouth advocacy for an advertiser or publisher and there is no effective means for rewarding product advocate consumers because advertisers lack the ability to track and influence user behavior in real-time. Beyond interaction with a displayed advertisement, advertisers lack an effective means to influence and reward desired behaviors of users such as their presence or advocacy. Simplistic coupon models are of limited interest to users because they are old and stale, and thus suffer from a declining population of users.

Driven by the shift from broadcast to interactive media, almost every aspect of advertising is being automated, including its sale, delivery, and measurement of performance. Moving away from the real estate metaphor of buying space, advertisers may now buy highly specific contextual events like "male consumer visits sports page on the weekend," or may buy more general bundles of contextual events. As a result, advertisers need more flexible and expressive ways to describe their ad campaign goals in terms of users' offline actions as well as users' online actions.

SUMMARY

What is needed is an improved method having features for addressing the problems mentioned above and new features not yet discussed. Broadly speaking, the present invention fills these needs by providing a method and a system for operating a sensor recording marketplace within a cost-per-action advertising system, and the method comprises the following: receiving a sensor recording and a sensor recording model; registering the sensor recording in the sensor recording marketplace; receiving a selection of the sensor recording from a client device that is coupled to the sensor recording marketplace; and sending the sensor recording to the client device.

The invention encompasses other embodiments configured with other features and alternatives. It should be appreciated that the present invention can be implemented in numerous ways, including as a method, a process, an apparatus, a system a device, or a computer program product.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION

Figure 1A:
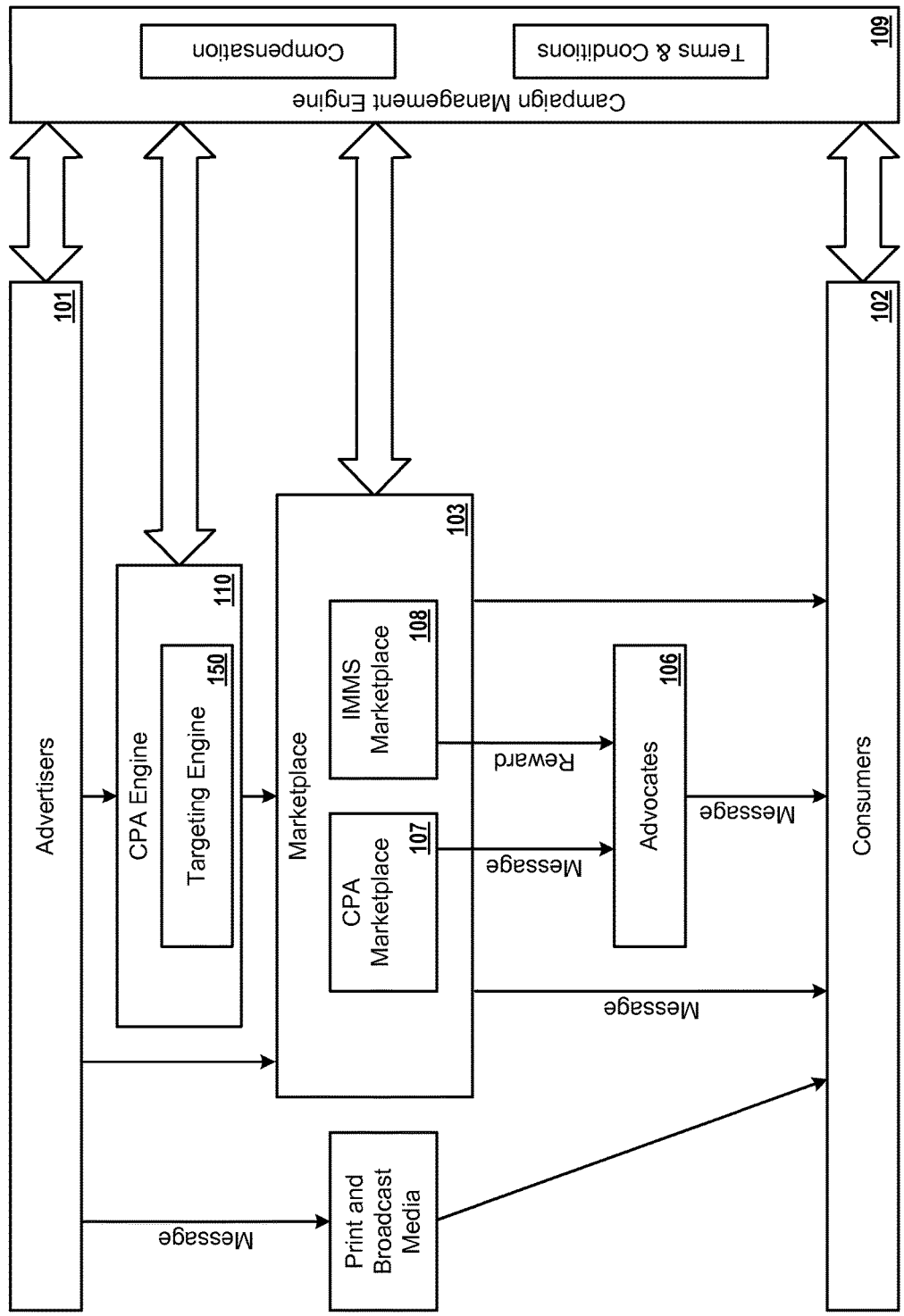
FIG. 1A is a block diagram of an ecosystem for operating a cost-per-action system, in accordance with some embodiments.

Herein are disclosed methods and systems for targeting, compensating, and operating a sensor recording marketplace within in a cost-per-action advertising environment. Numerous specific details are set forth in order to provide a thorough understanding of the present invention. It will be understood, however, to one skilled in the art, that the present invention may be practiced with other specific details.

Definitions

Some terms are defined below for clarity purposes. These terms are not rigidly restricted to these definitions. A term may be further defined by its use in other sections of this description.

"Advertiser" means an entity, user, organization, association or business that is advertising a person, place, thing, product, service, brand, event or other subject of ad copy. An advertiser may include, without limitation, a seller and/or a third-party agent for the seller.

"Advocate" means a user who explicitly or implicitly helps to advertise an advertiser's product or service, or is subject to other users via offline word-of-mouth, email, text, chat, media file or a live communication circuit.

"Author" means a person who generates a multimedia or sensor recording for others to use over a network.

"Creator" means a person who generates a multimedia or sensor recording for others to use over a network.

"Brick-and-mortar store" means a conventional store, business, etc, having at least a physical building or a physical facility that is accessible to consumers. A brick-and-mortar store offers goods, products and/or services to consumers for the purpose of shopping, testing, browsing and/or purchasing. A brick-and-mortar store may also be coupled to an online store that is accessible to consumers via the Internet or other network service.

"Computer" (e.g. "user computer", "client", "client device" or "server") may refer to a single computer or to a network of interacting computers. A computer is a combination of a hardware system, a software operating system, and perhaps one or more software application programs. Examples of a computer include, without limitation, a laptop computer, a palmtop computer, a smart phone, a cell phone, a mobile phone, an IBM-type personal computer (PC) having an operating system such as Microsoft Windows®, an Apple® computer having an operating system such as MAC-OS, hardware having a JAVA-OS operating system, and a Sun Microsystems Workstation having a UNIX operating system.

"Consumer" means a person who is the subject or target of an advertiser or advertisement or someone who seeks to acquire a product or service for use or ownership. For example, a consumer may be a woman who is browsing Yahoo!® Shopping for a new cell phone to replace her current cell phone.

"Database" means a collection of data organized in such a way that a computer program may quickly select desired pieces of the data. A database is an electronic filing system. In some instances, the term "database" is used as shorthand for "database management system".

"Device" means hardware, software or a combination thereof. A device may sometimes be referred to as an apparatus. Examples of a device include, without limitation, a mobile telephone, gaming or computing device, vehicles, appliances, software applications such as Microsoft Word®, a laptop computer, a database, a server, an environmental sensor or camera, a display, a computer mouse, and a hard disk.

"Interactive Multimedia Sensing (IMMS) marketplace" means a public sharing and trading space for sensor recordings of any kind.

"Marketplace" means a nexus of commercial activity where products and/or services are browsed, bought and/or sold. A marketplace may be located over a network, such as the Internet. A marketplace may also be located in a physical environment, such as a shopping mall.

"Network" means a connection between any two or more computers and users that permits the transmission of data. A network may be any combination of networks, including without limitation the Internet, a local area network, a wide area network, a wireless network and a cellular network.

"Online store" means a commercially-operative website having a presence on a network, such as the Internet. An online store is accessible to consumers via the Internet or another network service. An online store offers goods, products, information and/or services to consumers for the purpose of researching, shopping, testing, browsing and/or purchasing.

"Relevance data" means where, when, who and/or what, or spatial data, temporal data, user profile and social data, object data and/or topical data and metadata.

"Sensor recording" means any sort of recording of any series of events in any format, including any audio or video or movement or virtually any time sample-based recording.

"Sensor recording model" means any sort of metadata related to a sensor recording. A sensor recording model might include a model for distribution and usage, and/or might include a model for fee calculations. Or, a model might include any sort of metadata including decoders, encoders, viewing programs, recording programs, or any sort of computer code or instructions of any sort for facilitating intended use.

"Sensor" means any device capable of directly or indirectly reporting some movement, behavior or event or any changes of any sort in any environment. Multiple sensors may be combined to form sensing networks.

"Server" means a software application that provides services to other computer programs (and their users), in the same or other physically-distinct computers. A server may also refer to the physical computer that has been set aside to run a specific server application. For example, when the software Apache HTTP server is used as the web server for a company's website, the computer running Apache is also called the web server. Server applications can be divided among server computers over an extreme range, depending upon the workload.

"System" means a device or multiple coupled devices.

"User" means any general purpose person or proxy of a person or group of persons as well as a consumer, advocate, or author in a marketplace of products and/or services.

"Web browser" means any software program which can display text, graphics, or both, from web pages on websites. Examples of a web browser include, without limitation, Mozilla, Firefox® and Microsoft Internet Explorer® as well as their specifically-configured mobile device versions.

"Web page" means any document written in any mark-up language for presentation and interaction of information and data to users including without limitation HTML (hypertext mark-up language) or VRML (virtual reality modeling language), dynamic HTML, XML (extended mark-up language) or related computer languages thereof, as well as to any collection of such documents reachable through one specific Internet-accessible address or at one specific website or domain, or any document or digital object obtainable through a particular Uniform Resource Locator (URL) or Universal Resource Identifier (URI).

"Web server" refers to a computer or other electronic device which is capable of serving at least one web page to a web browser. An example of a web server is a Yahoo® web server.

"Website" means at least one web page, and more commonly a plurality of web pages at one or more domains, virtually connected to form a coherent group.

For the implementations of the present system, a software application could be written in substantially any suitable programming language, which could easily be selected by one of ordinary skill in the art. The programming language chosen should be compatible with the computer by which the software application is to be executed and, in particular, with the operating system of that computer. Examples of suitable programming languages include, without limitation, Object Pascal, C, C++ and Java. Further, the functions of some embodiments, when described as a series of steps for a method, could be implemented as a series of software instructions for being operated by a processor, such that the embodiments could be implemented as software, hardware or a combination thereof. Computer-readable media are discussed in more detail in a separate section below.

Functional Overview of Cost-Per-Action Ecosystem

FIG. 1A is a block diagram of an ecosystem for operating a cost-per-action system, in accordance with some embodiments. As shown, FIG. 1A depicts an exemplary cost-per-action (CPA) ecosystem including interactions between advertisers 101, consumers 102, and marketplaces 103. The ecosystem in which a cost-per-action system operates generally includes directed interactions between advertisers, consumers, possibly including advocate consumers 106, and possibly specialized marketplaces 107, 108, and any interactions possibly include use of media, possibly including highly-specialized uses of media.

As shown, advertisers 101 might reach consumers 102 with an advertising message through various communication channels including broadcast media and print media. Traditional advertising involving broadcast media and print media have inherent limitations (e.g. geographic bounds) as to targeting, fostering advocacy and rewarding advocacy. That is, audiences can be targeted, however individuals within such audiences often cannot be reliably identified, and hence there is little opportunity (i.e. within the bounds of traditional broadcast media and print media) for an advertiser to foster advocacy and reward advocates for their individual advocacy. Moreover, from the Internet has spring up marketplaces that are not bounded by geographic borders. Such marketplaces might be implemented strictly based on Internet actions, or they might be implemented using a combination of one or more Internet presences as well as one or more brick-and-mortar facilities. In some embodiments, an advertiser might register characteristics of an adverting campaign with a campaign management engine 109, and such an engine might communicate information by and between consumers, advertisers and marketplaces, and/ or with any participant in the ecosystem.

Function of Marketplaces in a Cost-Per-Action Ecosystem

As just mentioned, the marketplaces 103 might include any varieties of Internet presences. As shown in FIG. 1A, the marketplace 103 includes a cost-per-action marketplace 107 and an interactive multimedia marketplace (IMMS) 108.

The cost-per-action (CPA) marketplace 107 is an interactive brand or direct advertising engine for monetizing user actions, including discounts and revenue sharing with users, while providing a new advertising or sales support opportunity for advertisers. A CPA system 110 gives advertisers the ability to micro-incent consumer behavior by rewarding users who perform certain actions. Such actions might be verifiable using various techniques, some of which are disclosed herein. A specialized targeting engine 150 might be employed for matching actions (e.g. single independent actions taken or multiple dependent actions taken) with characteristics of complex offers within ad campaigns that specify terms and conditions of such commercial offers.

As just mentioned, the marketplaces 103 might include any varieties of Internet and/or brick-and-mortar presences. As shown in FIG. 1A, the marketplace 103 includes a cost-per-action marketplace 107 and an interactive multimedia (IMMS) marketplace 108, however it is reasonable and envisioned that a CPA engine 110 might also operate within the context of brick-and-mortar-based marketplaces, and rewards or compensation might be credited to users or advocates within either or both contexts.

Function of the Reward System in a Cost-Per-Action Ecosystem

The CPA compensation engine 160 (see FIG. 1B) is a specialized component of a CPA system 110 that enables a variety of compensation models. Such compensation models might include template-based models or do-it-yourself, explicit value models. Compensation might come in the form of micro payments, micro incentives, revenue-sharing, etc, and might be subject to performance of specific actions or occurrence of compensable events termed actions (which actions might comprise one or more triggers). Compensation might be made to consumers, consumer advocates, experts, marketplaces, publishers, networks, users or virtually any participant in the ecosystem, collectively termed contributing parties. The compensation engine tracks all actions together with their terms and conditions. In broad terms, the compensation engine matches actions to one or more contributing parties who perform an action or otherwise satisfy the terms and conditions of an action. The satisfaction of the terms and conditions of an action might then result in one or more compensatory events. The CPA compensation engine operates in real-time and is operable to sense completion of triggers and actions, match to compensable events, and distribute compensation to the contributing parties. Of course the CPA compensation engine is capable of performing using very simple models (e.g. single fixed-fee micropayment to a single user upon a single trigger, single variable-fee micropayment to a single user upon a single trigger), or using very complex models, possibly involving multiple contributing parties, multiple actions, multiple triggers, multiple events per trigger, multiple types of compensation, and using multiple techniques for action verification. Still more, the CPA compensation engine might vary one or more allocations and/or allocation variables and/or allocation operations in real-time, and might dynamically change an allocation based upon any sort of data or data streams available in the ecosystem.

Function of Participants within the Ecosystem

In exemplary embodiments, and referring to FIG. 1A, advertisers might communicate with a campaign management engine 109. Advertisers can independently, in conjunction with the marketplace or via a third-party marketing agency develop a campaign including a more or more actions possibly including one or more triggers. Indeed, an action might comprise a series of multiple triggers (possibly including action dependencies over time, etc), and corresponding desired terms and conditions (e.g. a goal, a method for verification, metrics for scoring quality of actions, etc), and upload them to a campaign management engine which in turn communicates to the marketplaces. As earlier mentioned, actions can be simple one-event tasks or transactions, or an action can be made up of more than one mutually dependent or independent triggers, and may be associated with one or more terms, conditions, goals, variables or any criteria that must be satisfied in order for the action to be considered satisfied.

The CPA compensation engine 160 embodies the intelligence layer responsible for allocating the revenue collected from advertisers in the normal operation of the CPA marketplace. In simple models, a simple fee is paid for satisfaction of a simple action, while in others the fee is variable depending on context or other advertiser- or marketplace-specified criteria. The allocation models can be explicit, or can be derived from a template, or can be defined according to an individual transaction-specific or trigger-specific model. Such a model typically indicates value and is typically defined by the advertiser. In some cases a model can be derived by the marketplace as early as at the time of campaign registration.

Function of the IMMS Marketplace in a Cost-Per-Action Ecosystem

The interactive multimedia sensing (IMMS) marketplace 108 is a public sharing and trading space for multimedia sensor recordings of any kind. Strictly as an example, one might consider co-mingling media sharing (e.g. YouTube, MySpace) with an online marketplace (e.g. Craigslist, eBay) to create a wide-ranging sensory recreation and experience. An IMMS is a virtual destination for anyone to upload and offer (e.g. offer for sale, offer as a continuing monitoring service, etc) a single sensor recording or series of sensor recordings. Strictly as an example, the sensor recordings might include traditional sense media (e.g. a video clip, a music selection), or the sensor recordings might include any of a variety of kinesthetic sensor recordings (e.g. recording of a tennis swing using a Wii transducer). Having such an uploadable sensor recording, and the ability to share it within the context of a marketplace, can result in increased value and significance ascribed to the sensor recording. Again, strictly as an example, a sensor recording might record any sports activity (e.g. a golf swing), a motor skill (e.g. a tai-chi movement), a dance, a training, or virtually any human activity or process. Any such sensor recording might have associated terms for download, for replay, and for reuse for any of a variety of purposes. As may now be recognized, a sensor recording suited for upload to an IMMS marketplace might be offered by users or by advertisers. In one embodiment discussed infra, a targeting manager matches recordings to likely consumers.

In various embodiments, the communications among participants within the ecosystem, together with the operations of an IMMS marketplace and targeting engine facilitates a new form of web-based economy trading in digital objects comprising a series of tagged and coded sensory recordings made by one user and then replayed and experienced by another user. Digital objects might be accessed through a web-based facility, possibly including a public directory or a database, and possibly including a search interface for retrieving information (e.g. metadata) related to any sorts of sensory recordings. Sensory recordings may include, without limitation, recordings of any object, topic, person, at any place and/or time. The aforementioned web-based facility might include the means for the recordings to be offered for sale as downloadable files. In some embodiments, the marketplace includes a communication connection to an advertising system for matching sponsored content and ad copy to the viewable pages, or free (or fee-based) downloads that present a pre-, post- or interstitial-advertisement together with the IMMS recording.

Overview of Architecture

As shown in FIG. 1A, the participants within the ecosystem communicate with a series of systems specifically deployed to manage advertisers (e.g. via the campaign management engine 107), to manage contributions of sensory recordings (e.g. via the IMMS marketplace 108), and to manage aspects of the user experience (e.g. via the campaign management engine 109). Any of the aforementioned systems might operate in conjunction with any one or more public, private, or semi-private front ends, and may interact within the ecosystem via one or more web applications, APIs, web services, engines, etc. organized to operate cooperatively.

Figure 1B:
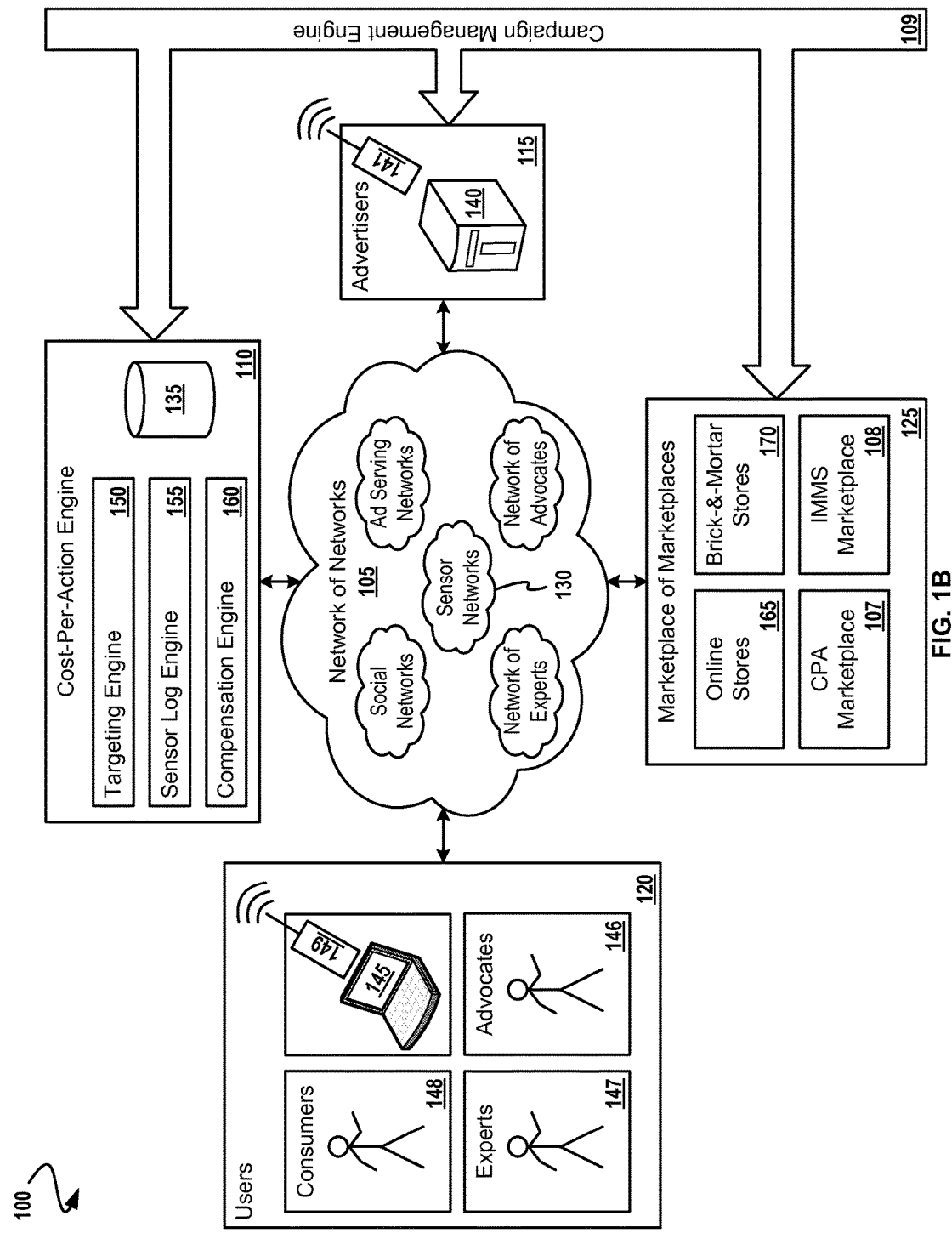
FIG. 1B is a block diagram of a cost-per-action system for providing delivery of interactive branding and direct advertising to monetize online and offline user actions, distribute ad copy, and share revenue with users, in accordance with some embodiments.

FIG. 1B is a block diagram of an exemplary architecture of a cost-per-action system 100 for providing delivery of interactive branding and direct advertising to monetize online and offline user actions, distribute ad copy, and share revenue with users 120 over a network of networks 105, in accordance with some embodiments. The network of networks 105 includes one or more ad sensor networks 130, and integrates together the functions of a cost-per-action engine 110, advertisers 115, users 120, and one or more marketplaces within a marketplace of marketplaces 125. A computer may communicate over the network of networks 105 by using a web server (not shown). The network of networks 105 and/or any constituent network may be any combination of networks, including without limitation the Internet, a local area network, a wide area network, a wireless network and a cellular network.

The cost-per-action engine 110 enables advertisers to offer compensation in return for a user's satisfaction of terms. The cost-per-action engine 110 may include, without limitation, a targeting engine 150, a sensor log engine 155, a compensation engine 160 and/or a database of databases 135. The targeting engine 150, the sensor log engine 155 and/or the compensation engine 160 may reside on one or more servers (not shown).

The users 120 may access the network of networks 105 via web browsers on user computers 145 or from interfaces on mobile devices 149. The advertisers 115 may access the network of networks 105 via web browsers on advertiser computers 140 or from interfaces on mobile devices 141. The marketplace of marketplaces 125 includes a directory of offers from any one or more of a wide range of sources, including without limitation, offers from advertisers, offers from online stores 165, offers from brick-and-mortar stores 170, offers from any one or more CPA marketplaces 107, and/or offers from any one or more IMMS marketplaces 108, or any Internet property of any sort regardless if the Internet property is configured as a store or not. Such marketplaces and stores allows users 120 to shop and/or browse for products, services, brands or other information. An online store 165 may have a website that is coupled to the network of networks 105. A brick-and-mortar store 170 may also have a website that is coupled to the network of networks 105. Moreover any brick-and-mortar store may have an interface to the Internet, and thus to the cost-per-action engine 110 such that the occurrence of a trigger or event may be registered with a cost-per-action system. A seller in the marketplace of marketplaces 125 may use an advertiser 115 to carry out an advertising campaign for the seller having a presence at a store.

Advertisers 115 may use the cost-per-action engine 110, possibly in conjunction with a campaign management engine 109 to manage their accounts and campaigns over time (e.g. make payments, change offers, group offers, create ad copy to publicize the offers, etc). The cost-per-action engine 110 may be administrated by a company such as Yahoo® or Google®. Alternatively, the cost-per-action system may be administrated directly by an advertiser 115. Other variations of the system 100 exist as well.

Embodiments of Cost-Per-Action Engine

Referring to FIG. 1B, the cost-per-action engine 110 is an interactive advertising engine for monetizing user actions. The monetizing may include, without limitation, providing discounts for users 120 and sharing revenue with users 120 as well as non-monetary compensation such as credits, airline miles or other system-specific stores of value. Non-monetary compensation may also include scores, ranks, reputation, status or levels based upon the value of the user's participation in the satisfaction of an advertiser offer in accordance with the terms of the requested action and the actual satisfaction. Non-monetary compensation may also include access to exclusive content or live feeds. The cost-per-action engine 110 also provides advertising opportunities and/or sales support opportunities for advertisers 115. The cost-per-action engine 110 gives advertisers 115 the ability to provide incentives for users and advocate users to behave a certain way by rewarding users 120 who perform requested actions under specific conditions, as defined by the advertisers 115. Actions, especially high-value actions, are verifiable through data aggregated using where, when, who and/or what ("relevance data") techniques or any other verification techniques. The cost-per-action engine 110 is configured to actions with ad campaigns actions and participating users and to monetize satisfaction of actions. The cost-per-action engine 110 also provides an interface to advertisers (e.g. via the campaign management engine 109) for specifying actions and/or terms of commercial offers, as well as an interface to users 120 (e.g. via a web browser) to monitor or confirm satisfaction of those requested actions, conditions and/or terms.

The cost-per-action engine 110 cooperates with a network of back-end devices to manage advertisers 115, users 120, sensor sources and/or data sources. The back-end components include, without limitation, the targeting engine 150, the sensor log engine 155, and the compensation engine 160. The back-end components use front-end components, such as web applications and/or application program interfaces (APIs), to interface with each constituency according to their needs. The system 100 is discussed in more detail below with reference to the appropriate figures.

Figure 1C:
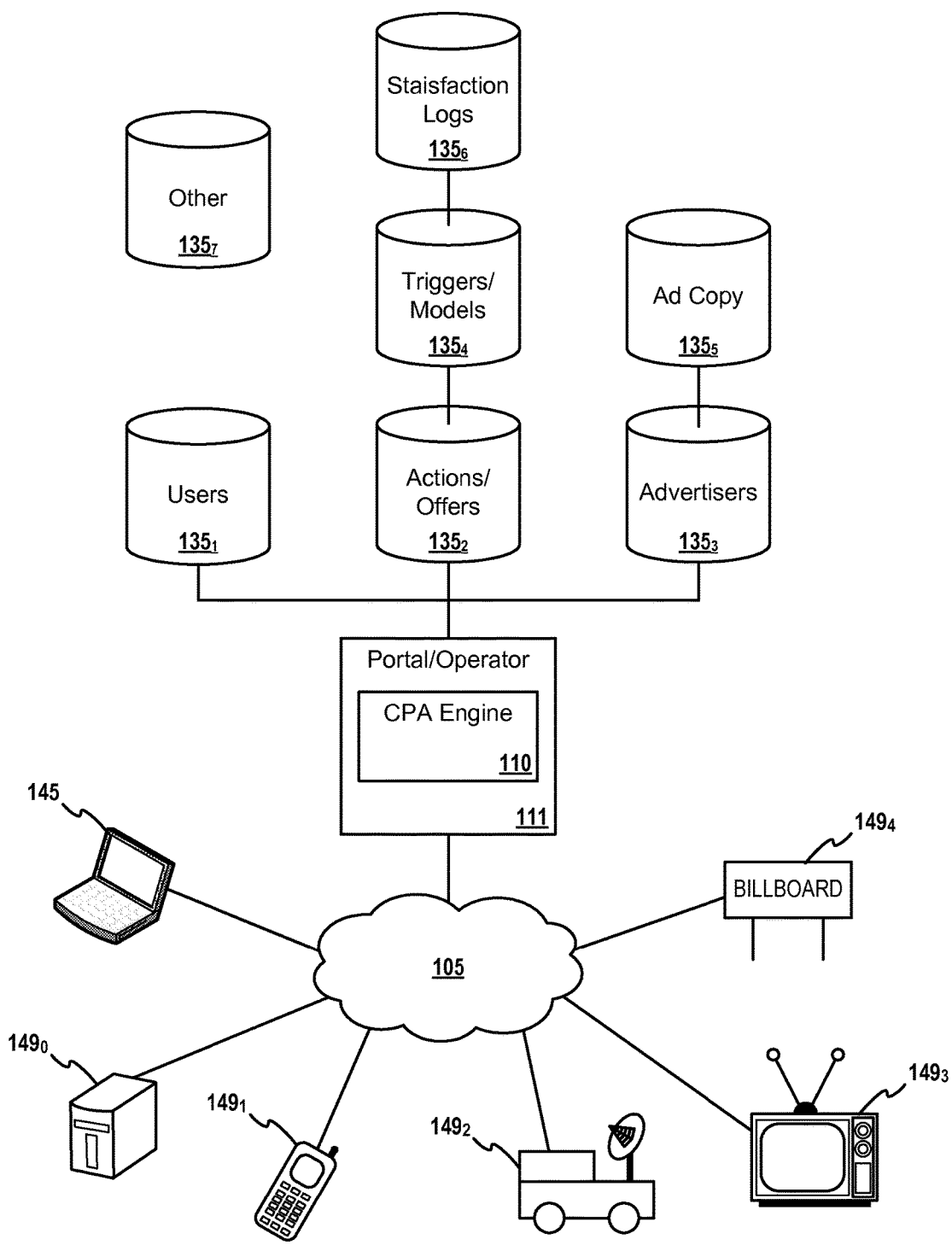
FIG. 1C is a schematic showing data communications within a cost-per-action system, in accordance with some embodiments.

FIG. 1C is a schematic showing data communications within a cost-per-action system, in accordance with some embodiments. As shown, FIG. 1C depicts an embodiment of a CPA engine, in particular including interaction with devices and databases. In the abstraction as shown, the CPA engine 110 communicates with a computer 145, and or any one or more mobile devices including, without limitation, a cellphone $149_1$, a vehicle, $149_2$, a mobile terminal $149_3$, a billboard $149_4$, and/or any arbitrary device or sensor $149_0$ whether mobile or not. Similarly, the CPA engine 110 communicates with any number of databases, including without limitation a user database $135_1$, a action/offer database $135_2$, an advertiser database $135_3$, a triggers/models database $135_4$, an ad copy database $135_5$, a satisfaction log database $135_6$, and/or any arbitrary database $135_7$. Of course as earlier indicated an embodiment of a CPA engine 110 might be implemented within a portal administrated by a company such as Yahoo® or Google® (see portal/operator 111).

Figure 1D:
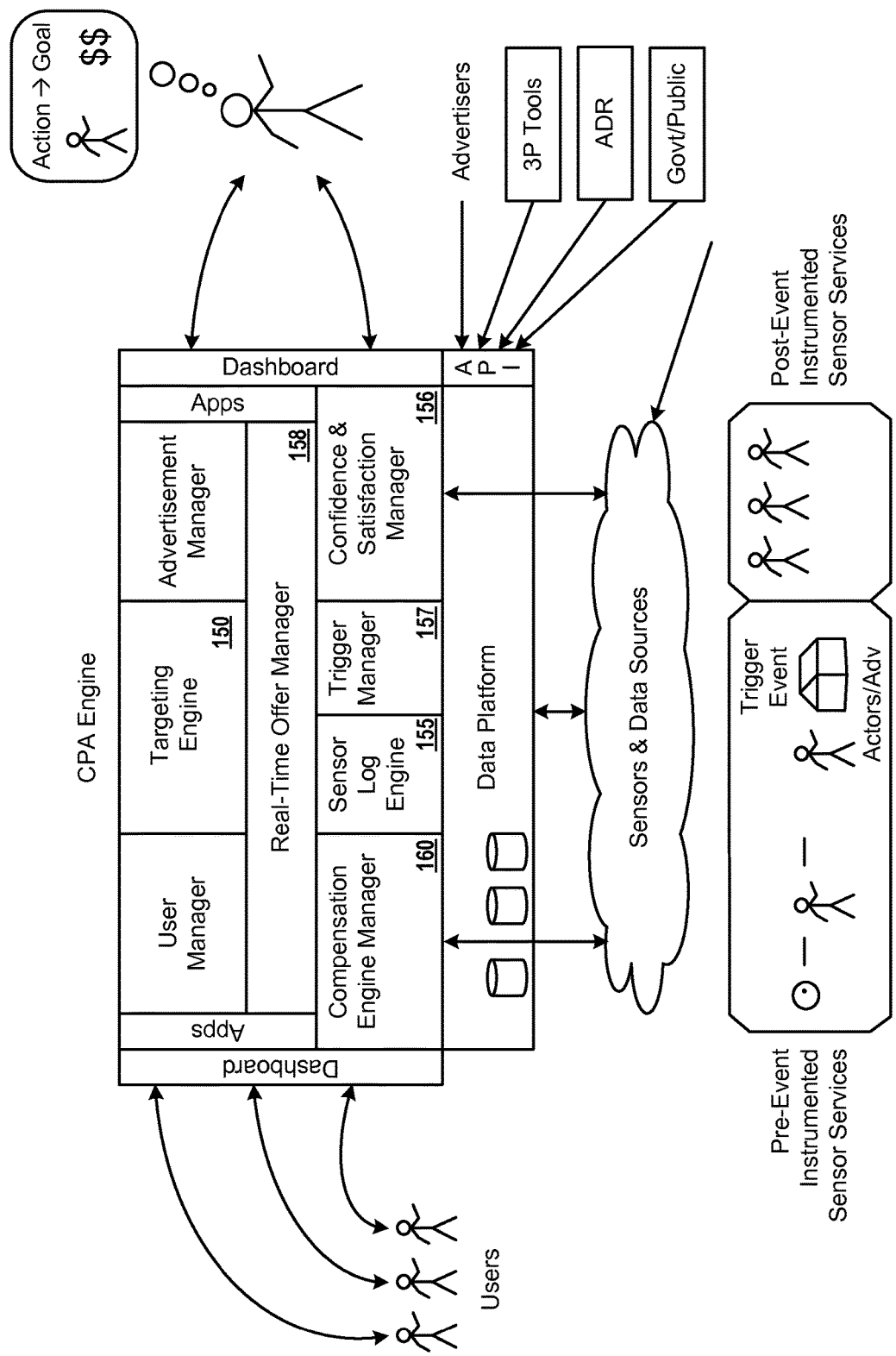
FIG. 1D is a block diagram of a cost-per-action system including actors and observers, in accordance with some embodiments.

Now, with the foregoing description of the ecosystem participants, ecosystem devices, and certain structures present in some embodiments, FIG. 1D is a block diagram of a cost-per-action system including actors and observers, in accordance with some embodiments. As shown, FIG. 1D depicts a CPA engine interacting with advertisers and users in order to capture advertising campaign actions and/or goals, and record satisfaction of such actions and/or goals. Advertisers register one or more characteristics of an advertising campaign. In exemplary embodiments, such characteristics might include advertiser's quantitative goals, and might also include any number of actions together with terms and conditions for satisfaction of an action. In some cases, an advertiser's goal may equate to an action, or a goal may express different outcomes that affect the terms and conditions corresponding to the action defined by the advertiser. Since a description of an offer may include the desired action, the offered terms and the goals, or any arbitrary quantitative or qualitative metric for measuring the success of the CPA, a campaign might be represented by the action or set of actions. Advertisers can establish hundreds or thousands or more offers to run concurrently, and such offers may be addressed individually or may be addressed by groups according to advertising copy, advertising campaigns, demographics or other groupings, as may be desired by the advertiser.

It should be emphasized that any event, process or activity that can be described and instrumented can become an action, thus the set of actions comprise an unbounded set of current and possible future measurable events/responses/actions. In some embodiments, the CPA engine can conduct a confidence evaluation for the requested action by comparing historical records and current available sensor and user data sources to forecast the likelihood of availability of enough data to evaluate the accomplishment of the requested event/response/action. In some cases, the confidence evaluation processes include analysis of any data available from any source.

Referring again to FIG. 1D, the figure depicts in schematic form the presence of a cloud of sensors and data sources, and a grouping of persons or sensors involved as observers, or actors with pre-event instrumented sensors, and a further grouping of persons involved as observers, or actors with post-event instrumented sensors. In the exemplary case depicted in FIG. 1D, data available to be used in confidence evaluation processes becomes available as a result of an event (e.g. checkstand purchase of a specific book at a brick-and-mortar store). The likely (future) occurrence of the event might have been observed by an observer (e.g. a person who received survey answers from an actor just prior to the checkstand purchase). Continuing, the occurrence of the purchase event is further confirmed by a post-event sensor (e.g. RFID scan of the purchased book as the purchaser departs the brick-and-mortar store). Of course the foregoing is but one example, and sensor data might come from the actors or observers, or network and/or environmental sources, and any such sources might be used in establishing the actual occurrence (or likelihood of a future occurrence) of the satisfaction of an event or trigger. Such sensor data might provide sufficient information so as to document unassailable corroborating data. In some cases, and even when there are sufficient sensors available, if data corresponding to the current action-goal combination is not arriving at a statistically useful rate, the CPA engine may suggest changes the advertiser can make to the campaign in order to modify the action definition so as to increase the instrumentability of their request. For example, a CPA engine might suggest that the brick-and-mortar store operator register their POS system into one or more systems that provide data to the CPA engine.

Assuming enough reliable data sources exist, the CPA engine publishes advertisers offers to the public through a browsable and searchable interface for the purpose of matching satisfying users with advertisers. In some embodiments, the CPA engine includes a targeting engine which uses a confidence score possibly from a confidence and satisfaction manager 156 and data source profile (e.g. from a data platform) and an optional (not shown) forecasting engine to increase coverage and reach of advertisers to users (or users to advertisers).

In some embodiments, the targeting engine creates a trigger file $135_4$ for actions and populates the file with sensor data (e.g. from users, or from sensors) as appropriate over the life of the offer. In some embodiments, more than one user may be involved in satisfying the requested action. For example, one user might participate by playing the role of advocate or proxy for the advertiser, and the other user might participate by playing the role of consumer or potential consumer of the advertisers products, services, brands or other information. Multiple advocates may eventually help one consumer before satisfaction of an action. In such a situation, the CPA compensation engine allocates and distributes any revenue or value due from the advertiser among the contributing parties according to an advertiser-defined compensation distribution model. Such a distribution model might be a simple model, or it might be a complex model, possibly involving specific compensation for advocate actions, possibly including seniority/distribution agreements, (e.g. franchise or co-marketing agreements) and possibly including combinations of monetary and non-monetary compensation.

Returning to the embodiment of FIG. 1D and continuing the description, users can browse, search, self-discover or be introduced to advertisers' offers (e.g. "Do this action X for this compensation Y"). When a user has determined that he/she can satisfy the action, the user can either (a) explicitly register an intention to satisfy an action, in which case they are registered and tracked via the compensation engine manager 160 and trigger manager 157; or (b) add the action to their personal trigger tracking dashboard, in which case their personal trigger manager client will monitor their daily activities and suggest actions when the user encounters opportune environments for known actions/compensation opportunities. In some embodiments, a user's trigger management and tracking processes are handled on the user's devices and environments. In other embodiments, all data and intelligence, whether shared or private, are stored on a central server that provides access to and from devices and data platforms. Once one or more users satisfies an action, the trigger manager 157 sends a potential event satisfaction message to the confidence and satisfaction manager 156, which compares the actual data stream around the event with the expected data stream and applies a confidence score. If the confidence score is above a specified threshold, the event is deemed as satisfied and the trigger manager 157 sends a certified event report, possibly including specific evidence (e.g. a POS report) to the data platform e.g. satisfaction log $135_6$), thus making the satisfaction of the action available to the CPA engine.

As shown, the embodiment of FIG. 1D includes a real-time offer manager 158 for real-time offer, trigger and progress coordination. The real-time offer manager sends data to an actions/offers database $135_2$ as well as to other processes involved in the real-time offer management. Of course various embodiments are self-cleaning, and the real-time offer manager will remove an action when satisfied if it was a once-only action, or increment the satisfaction counter towards a goal, which can in some cases impact the terms of the published offer as well as the compensation due to not-yet-satisfied actions in progress. As shown, both users and advertisers have a dashboard by which to track their various actions and their confidence scores and progress (e.g. percentage) toward completion. A dashboard interface serves for displaying or controlling other useful statistics and metrics as well.

If the action and the goal of the advertiser are the same (e.g. action defined as write favorable review of advertiser product), the terms of the action can be immediately resolved upon satisfaction reporting (e.g. confirmed availability of blog post on product), and value (e.g. compensation) can be immediately collected from the advertiser and distributed to the portal/operator 111 and/or users, and/or advocates, and/or publishers, and/or any other third-party facilitators to the actions that are due compensation. If the goal is variable and/or separated in some way (e.g. via time delay) from the action (e.g. write a review of an advertiser's product that is well received by at least ten people within five days), the publishing of the review post might be merely the first trigger in the action. A subsequent event to reach the goal might specify some metric for how well the action satisfies the goal (e.g. number of views, comments or indications that the review was helpful, etc). In another example, the action might be defined as "Bring a new customer to our new store," while the goal is "Have the new customer spend over $100." In one instance, a user can bring their friend to the new store, but if the friend buys only $50 of merchandise, there is either no compensation due under the CPA model or perhaps a more modest compensation, or perhaps even non-monetary compensation might be due. In another example, a user might bring a friend to a store other than the "new store," but they spend over $100. For such a case, other participants in the marketplace might push such cases to advertisers on the advocate's behalf.

In one embodiment the cost-per-action engine 110 includes a targeting engine 150 for matching actions to users and users to advertisers as part of a premium or standard service to users and advertisers.

On the advertiser side, the targeting engine 150 can be of service in several contexts such as (a) automatically suggesting of users as targets for the advertiser's desired actions; and/or (b) identifying opportunities for co-branding and/or multiple-advertiser campaigns and/or other campaign-management; and/or (c) developing specialized CPA-based customer base expansion campaigns or applications.

Further examples of automatic suggestion include scenarios where the targeting engine can automatically or semi-automatically offer an advertiser a direct-marketing campaign to drive a specific subset of users to the advertiser's CPA listings. Such suggestions include, without limitation, outbound emails, SMS or other outbound distributions for broadcasting the listing/offer. Over time, the targeting engine refines a timing of notification of the offer in order to reach users in the real-world who are deemed to be situated in the best circumstances to easily satisfy the requirement(s) of the action, goal or at least one trigger event. Such users can be suggested to the advertiser through the advertiser's Manager interfaces (e.g. dashboard, applications, etc). Alternatively, advertisers might manually or programmatically choose users who are deemed to be situated in the best circumstances to easily satisfy the requirement(s) of the action. In still other embodiments, a targeting engine can implement an automated service by selecting the best opportunities for a user based on willingness and ability to satisfy actions. For example, advertisers can monitor actions associated with strict criteria and perhaps alter or relax the criteria to better match the current stream of sensor data from users. In some embodiments, the portal/operator 111 of the CPA engine might be compensated based on the satisfaction of actions where the targeting engine has played a role in matching an action to one or more users who in turn satisfy the terms and conditions of the action. Of course, such compensation to the portal/operator being allocated according to previously agreed to, or real-time established, or otherwise established, terms.

In the co-branding context 150, the targeting engine performs pattern recognition and data mining operations on historical data, possibly including historical action satisfaction and goal transaction data sets in order to identify co-occurrences of advertisers with certain patterns or sets of patterns (e.g. average customer, best customer, people to avoid, etc). Starting with a set of known customers for the advertiser, individual and aggregate data are analyzed for patterns in general, and/or patterns related to action satisfaction, and/or patterns related to goals. Those patterns are mined for the co-occurrence of other brands or advertisers, and such correlations can then be shared with advertisers, possibly as a premium service or as a data access service, and/or can be used in combination with any sorts of other professional targeting services, whether the targeting services are fully automated, partially automated or even fully manual. In some cases targeting services serve for mediating co-branding campaigns involving two or more advertisers and in some cases targeting services develop specialized multi-trigger campaigns.

As for developing specialized CPA-based customer base expansion campaigns or applications, it is reasonable and envisioned that all advertisers' customer lists and associated data are compared together to identify spot overlap. In some cases, the overlap exists due to expected and/or actual overlap, and in some cases overlap exists only as a result of an explicit model, whether or not data is (yet) available to confirm any actual overlap. The matching users (e.g. users identified in any overlap) can be priority ranked by likelihood of target or by intimacy of social connection of a target to an existing customer or advocate, or they may be ranked using any other ranking criteria. In one embodiment, this intelligence could be offered to users as a premium service such as offering "Ways to make money with your friends." An offer in such an embodiment presents suggestions including a ranked list of known contacts for a user, and/or including a prioritized brand or advertiser ranked list for each of the user's known friends. For example, a suggestion might be presented as "Your friend Bob is likely to want to accept a BMW action offer, but he hasn't, so if you can get him to do it, the advertiser will pay you $10." Or, a suggestion might be presented as "If your friend Bob signs up for a test drive, you get $25 dollars, if he actually test drives and joins the mailing list, you get $50, if he buys the same day, you get $1000 dollars, if he buys within a month, you get $500, if he buys within six months you get $250."

On the user's side, the targeting engine might use the same analysis and operations to derive insight, and might share or monetizes the insight to the users. Thus, the targeting engine serves users as a real-time or batched alert service for monetary or other kind of CPA-based compensation. Events involving people, places, things, topics, times, or any other data existing in the user's environment/cyberspace that offer an opportunity to satisfy an existing action and/or goal might result in an alert sent to the user. Also, the targeting engine provides users an additional role as an alert service for monetary or other kind of CPA-based compensation by identifying behaviors, associations or communications that qualify for some value exchange with advertisers. Included in the aforementioned behaviors are near-behaviors, in which case the trigger manager 157 serves as a resolution service for action satisfaction by facilitating changes in user behavior. In this way the alerts can be alerts of opportunities, or alerts may take the form of an auto-enrollment in some program or daily life interaction suited to achieve action satisfaction.

To facilitate use of somewhat more formal language used herein, the following table of terms and possible attributions are presented:

| Term | Possible Attributes |
| --- | --- |
| Players | advertisers, or marketer |
| | product advocate |
| | user |
| Ability | verifiable actions |
| | trackable affinity and behavior over a period of time |
| Presence Action | time at location |
| | bookmarking |
| | duration, frequency |
| | object interaction (e.g. if person rides in a friend's car to test it out) poaching (prevent a person from buying or checking out competitor products) |
| | recover customers |
| | managing foot traffic (dynamic real time action dial) |
| | real time load balancing e.g. directing users to a specific location or action |
| Research | search |
| | compare |
| | call |
| | locate |
| | write |
| | sample |
| | review |
| Advocacy/Viral | review |
| | recommend |
| | poaching |
| | sharing of information/product |
| | forwarding of information |
| | engaging in sponsored/branded activities such as sponsored ringtimes/ringback, sponsored profile photos (not unlike wearing a branded outfit) |
| | bring/send a friend along |
| | presence viral advocacy |
| Communication | confirmation |
| | creating positive UGC surrounding product and services |
| Transaction | buy |
| | repeat buying |
| | subscribing |

-continued

| Term | Possible Attributes |
| --- | --- |
| Post-purchase | further advocacy<br>suggestions for improvement, feedback<br>repeat consumption/loyalty |

Sample Scenario A

James loves his Mini Cooper and knows that Jane is shopping for a fuel efficient car. James has already opted into the Mini Cooper CPA program. He has already registered to be a Mini Copper advocate.

James takes Jane out for a drive several times in his JCW customized Cooper S. He also drives Jane to the Mini Cooper dealers so she can look at the different options. He also sends Jane a series of Mini Cooper-relevant links for research.

The CPA system tracks James' and Jane's behavior. The system rewards James for allowing Jane to drive his car, taking her to the dealer and for forwarding her the links.

Sample Scenario B

James opts in by registering to the system. The system will request his profile and behavior tracking preferences. James can granularly control the tracking settings to limit the tracking of his behavior to only certain types of actions (e.g. limit the tracking of his behavior corresponding to only specific temporal, social-spatial and/or other relevant conditions).

The system performs an ID verification test on James and Jane (e.g. mobile device registered to the members; and/or image/audio/video recognition through photo/audio/video capture compared against member database). The system is able to track that James allowed Jane to drive the car by tracking James' and Jane's GPS coordinates. The system can recognize Jane through her registered profile such as her unique Bluetooth ID or RFID. The system can also opt to authentic Jane's and James' presence/action by their biometric login, etc.

The system might embed cookies or other similar tracking technologies on the links that James forwards to Jane. Alternatively the system can push highly relevant links to James for James to forward to Jane.

The system tracks Jane's click-through activities, aggregates the data and sends a report. Once the system verifies that the advertiser's terms and conditions associated with the action have been met, the system forwards the rewards to James using James' selected communication method of choice (e.g. SMS, email, postal mail, etc).

As may be understood from the foregoing scenario, any action being satisfied establishes conditions for the system to identify and exploit co-branding opportunities. Advertisers and marketers can use the system to create complex joint advertising campaigns on the behalf of more than one advertiser/brand that rewards user behaviors that are favorable towards multiple advertisers. For example, Mini Cooper can work with local Mini dealers, content aggregator sites, as well as local energy commissions to create a campaign that will incent positive user behavior. In one embodiment the system is capable of being a mediator system that matches advertisers together with the appropriate users. Of course the notion of multiple advertisers interested in the same user or user groups might (but not necessarily) also imply competition, as is demonstrated in the following scenario.

Sample Scenario C

Jane is looking for a fuel-efficient car. After James registers her into the system, she does her own research by looking at the Prius and the Hybrid Civic.

The system reviews its database of registered advertisers/marketers, campaigns and aggregated behavior of other registered users that are relevant to Jane.

The system acts on available options, surfacing information from the highest bidder of the advertising category, such information including ads or other information biased towards the highest bidder accompanying Jane's relevant actions. In this scenario, the highest bidder was an advertiser for the Prius.

The system acts on available options, surfacing all contextually relevant information to Jane (with or without consideration for the highest bidder) from the database.

In the above scenarios, it can be seen that product advocate users perform valuable actions for marketers/advertisers, and accordingly the system encourages and rewards high-value actions, especially those actions that result in support of final decision making and purchase events.

Referring to FIG. 1D, in one embodiment, the CPA real-time offer manager 158 is capable of matching advertisers with other advertisers that have relevant advertising campaigns (e.g. targeting the same sets of users, targeting the same sets of conditions etc). Alternatively, the advertisers can approach other advertisers in or out of the system to do collaborative campaigns.

Embodiments of a Targeting Engine in Cost-Per-Action Advertising

Returning again to FIG. 1B, the targeting engine 150 of the cost-per-action engine 110 may be configured to allow an advertiser 115 to define requested actions, conditions and/or terms for a cost-per-action ad campaign. The cost-per-action engine 110 may also be configured to target user 120 via the requested actions, conditions and/or terms. The requested actions, conditions and/or terms include at least one requested action and at least one requested term. The targeting engine 150 registers the requested actions, conditions and/or terms to a database 135. The database 135 may be accessible to users 120 to search and browse the various requested actions, conditions and/or terms.

The requested actions, conditions and/or terms define the way in which a user 120 may interact within the marketplace of marketplaces 125 (e.g. by making a purchase or recommendation), or within the network of networks (e.g. by triggering a sensed event) in order to qualify for compensation for such interaction. A requested action may be defined as a simple one-event task or transaction, or an action may be a compound action. Indeed, in some embodiments, requested actions, conditions and/or terms may be defined according to a hierarchy of multiple independent tasks or multiple dependent tasks. And in some embodiments, requested actions, conditions and/or terms may be defined according to a sequence of multiple independent tasks or a sequence of multiple dependent tasks. Multiple independent tasks may be, for example, buying a watch at Costco and buying a futon at Costco. Multiple dependent tasks may be, for example, exercising more, running one mile, and putting on running shoes. The hierarchy may also include an acceptable sequence in which the tasks may be performed. An acceptable sequence may be, for example, putting on running shoes and then running one mile. The hierarchy may also include an acceptable substitution for a particular task. An acceptable substitution may be, for example, biking five miles as a substitute for running one mile. The hierarchy or sequence may define varying degrees of generalization or specialization of the constituent tasks. For example, 'exercising' may be deemed to have a particular degree of generalization, while 'running one mile' is a specialization within the more generalized task of exercising more. An advertiser 115 and/or the targeting engine 150 may define the sequence and/or hierarchy of tasks within the requested actions, conditions and/or terms.

The requested actions, conditions and/or terms may include, for example, information about the following: coming to a location, bringing other users to a location, testing a product, testing a service, purchasing a product, purchasing a service, starting a subscription, generating media, generating annotations, meeting position values, meeting velocity values, meeting direction values, meeting acceleration values, and/or meeting biometric values (e.g. heart rate).

The action carried out by a user 120 may be sensed or carried out over the network of networks 105, but does not necessarily have to be carried out over the network of networks 105. The user 120 may, for example, perform a requested action in a brick-and-mortar store 170 or other location of interest to an advertiser. For instance, a user 120 may see an advertised product via a web page delivered over the network of networks 105, or on TV, and then walk into a brick-and-mortar store 170 and purchase the advertised product. The brick-and-mortar store may then report the action to the cost-per-action engine 110. Alternatively, the user 120 may report the action directly to the cost-per-action engine 110.

Of course the just-described reporting alternatives are merely examples of reporting of a satisfaction of an action. In more involved embodiments, any number of sensors might be used. In fact one or more sensing networks 130 is included in the aforementioned network of networks, and data from any such sensing network might be used in determinations of occurrences of events, triggers and/or satisfaction of actions according to the associated conditions.

Figure 1E:
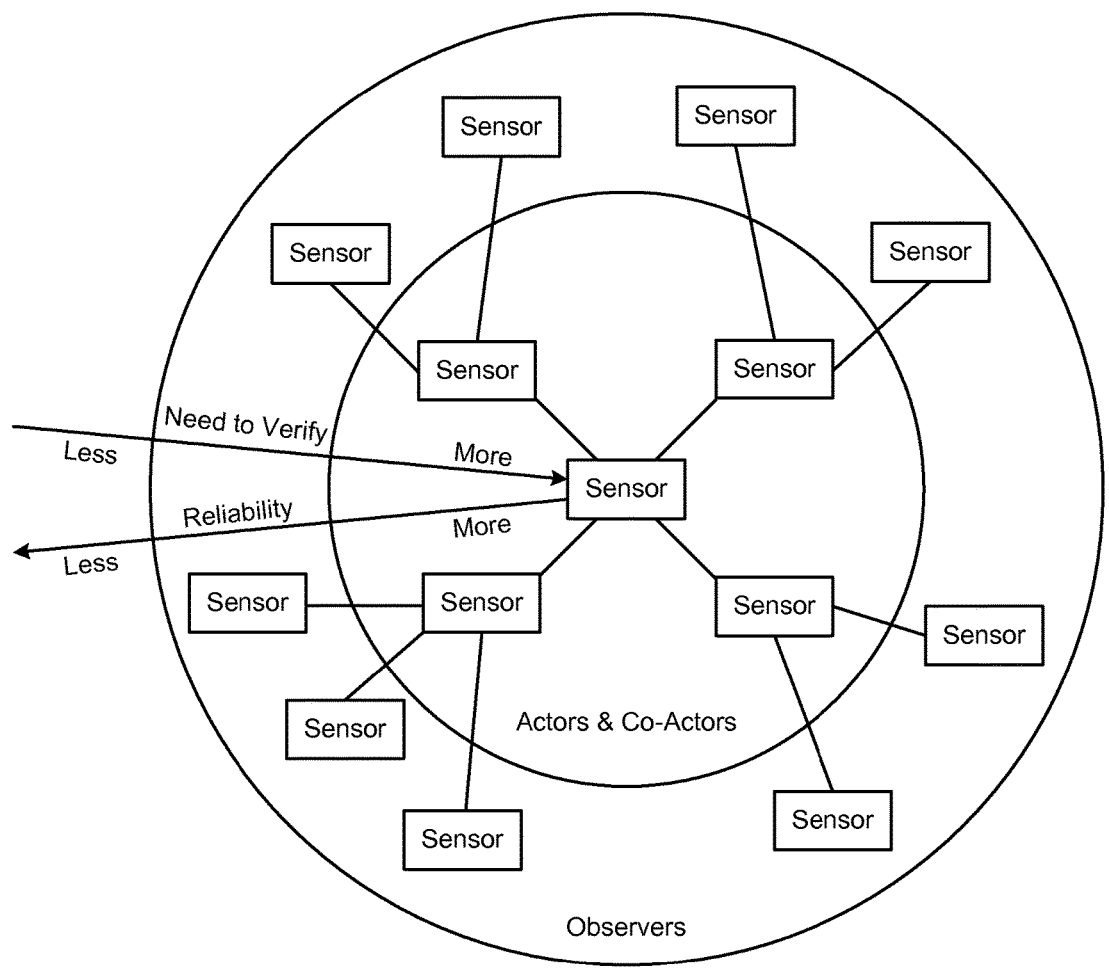
FIG. 1E is an abstract model for interpreting sensor data within a system for operating a cost-per-action system, in accordance with some embodiments.

FIG. 1E is an abstract model for interpreting sensor data within a system for operating a cost-per-action system, in accordance with some embodiments. As shown, FIG. 1E depicts an exemplary network of sensors. In the abstraction as shown, sensors are situated radially about an abstract central point. Also shown are two abstract boundaries depicted as concentric circles about the central point. These boundaries serve to demark sensors by proximity to the central point. That is, the closer a sensor is to the central point the more likely the sensor is activated directly, for example by an actor or a co-actor. Conversely, the farther a sensor is to the central point the more likely the sensor is activated indirectly, possibly by an observer. Still referring to this abstraction, and in more general terms, the closer a sensor is to the central point, the more likely the sensor data is able to reliably report on the occurrence/non-occurrence of some action, trigger, or event. Such a model might be expanded to include any number of real sensors, and sensor data might be then used in scoring within a confidence and satisfaction manager 156. In some scoring regimes, the reliability of sensor data to accurately predict an event or outcome is weighed against the need to verify the event or outcome. For example, the need to verify a $100 reward payment might be considered 'high', whereas the need to verify some qualitative aspect of a book review for a $0.10 payment might be considered low. Similarly, with respect to the reliability of sensor data, a POS record of a credit card purchase might be considered highly reliable, whereas the number of responses to a book review might be considered to have lower reliability.

Figure 1F:
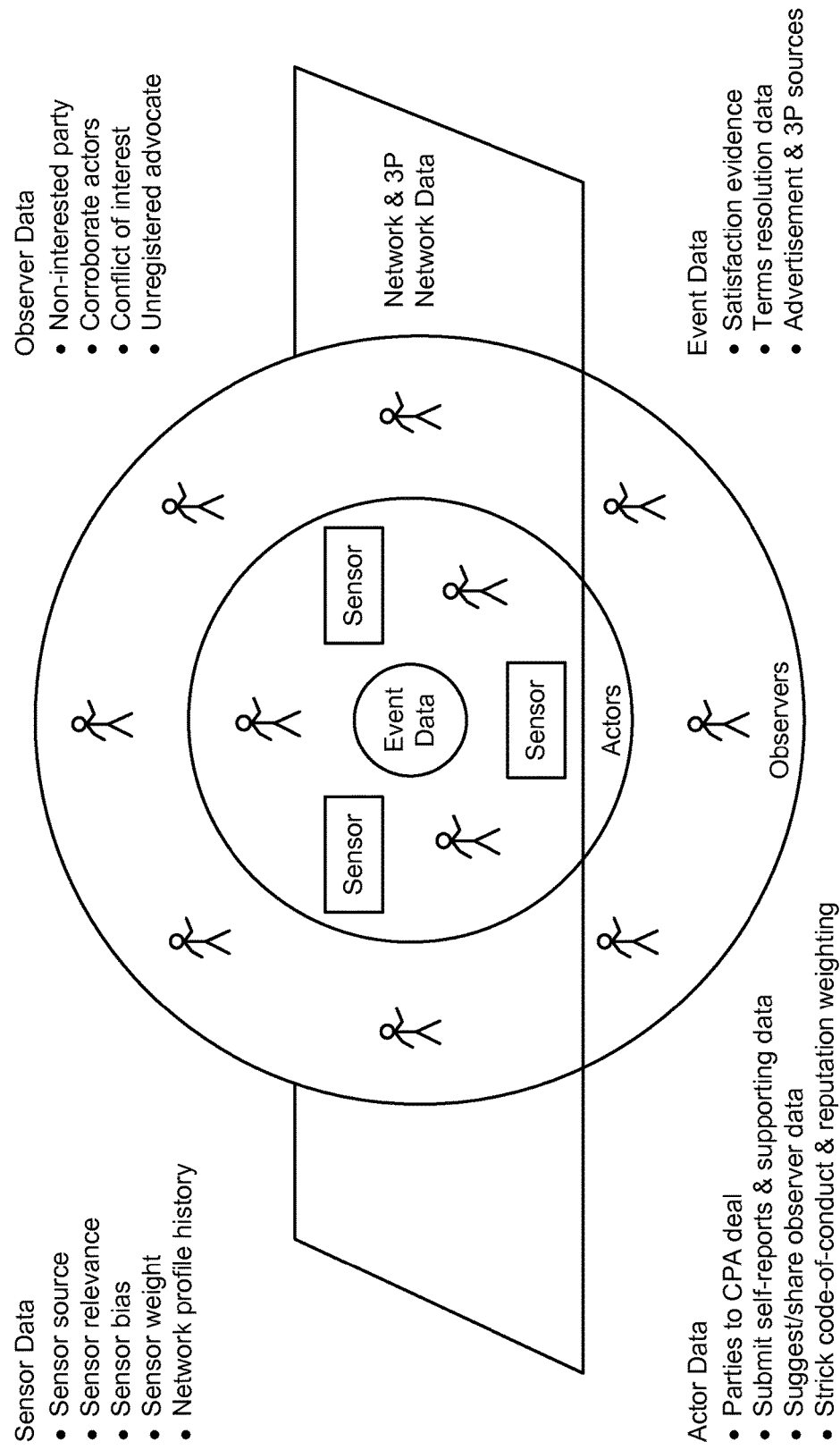
FIG. 1F is an abstract model for satisfaction scoring using sensor data within a system for operating a cost-per-action system, in accordance with some embodiments.

The techniques for scoring satisfaction may include scoring based on the aforementioned sensor data, however sensor data is not the only data considered. FIG. 1F is an abstract model for satisfaction scoring using sensor data within a system for operating a cost-per-action system, in accordance with some embodiments. As shown, FIG. 1F depicts various sources for data that might be used in CPA satisfaction scoring. As shown, data might include observer data, event data, and actor data as well as the aforementioned sensor data. Considering each genre of data in turn, sensor data might include the location of the sensor data relevance to the terms and conditions, sensor bias and/or weight relative to other sensors, and possibly a history from a given sensor. Observer data might include indications from observers who might be able to corroborate (or refute) an actor's indication of satisfaction of an action. Event data might include hard or irrefutable data such as satisfaction evidence in the form of a POS record. Event data might also include or use rules for terms and conditions resolution. Still more, event data might also include event data provided by the advertiser (e.g. an event or response via some offline technique) or even third-party data as it may relate to scoring the satisfaction of an action. Of course, techniques for scoring satisfaction might include data supplied directly by the actors themselves. Such data could come in the form of self-reporting (reporting by an actor), or it could come in the form of an actor's suggestion of verification via some alternative data set (e.g. third party, specific event data, specific sensor data). Techniques for scoring satisfaction might also include reputation data.

Thus, with a network of sensors, and with techniques for verification or prediction of events, triggers, or actions, an advertiser is in a position to define an ad campaign that includes requested actions, conditions and/or terms for determining if the requested action has in fact been completed (with some confidence factor), or a prediction of if and when the requested action will be completed (again with some confidence factor).

Accordingly, given the facility of one or more sensor networks, the targeting engine 150 may be configured to incorporate the goals of an advertiser 115 for an ad campaign into the requested actions, conditions and/or terms. The advertiser sets the actions, conditions and/or terms by uploading requested actions, conditions and/or terms to the targeting engine 150 of the cost-per-action engine 110. The set of actions, conditions and/or terms define offers that an advertiser 115 is making to users 120. The set of actions, conditions and/or terms define the metrics for measuring the satisfaction of the cost-per-action ad campaign and any compensation. In some cases, the set of actions, conditions and/or terms that define the metrics for measuring the satisfaction might also include indication(s) of how the metrics can be obtained. For example, an advertiser might specify that an action will be deemed satisfied when (for example) a product rebate payment had been recorded by the advertiser's rebate processing staff.

A campaign may include any number of offers. In fact, an advertiser 115 may run, for example, one, tens, hundreds, thousands or more offers in one time period. An advertiser 115 may also group offers according to ad campaigns, demographics and/or other useful subsets for targeting users 120. Any definable process or activity that can be described and instrumented may be a requested action, condition and/or term. Accordingly, actions, conditions and/or terms are an unbounded set of current and/or future measurable events or responses that users 120 may perform.

Of course, even before launching an offer, an advertiser would want to evaluate predicted performance of the campaign over time. Accordingly, the targeting engine 150 may be configured to carry out a confidence evaluation for the requested actions, conditions and/or terms. The confidence evaluation involves calculating a confidence score for the requested actions, conditions and/or terms. The confidence evaluation may include comparing historical records, current sensor sources, and/or current user data sources. The targeting engine 150 uses the comparison to forecast the data availability for accurately tracking the requested actions, conditions and/or terms. High data availability will tend to cause the targeting engine 150 to calculate a high confidence score. The forecast of the data availability may include analyzing data associated with users 120 who may satisfy an action, condition and/or term. Such users 120 may include actors to an action and/or observers of an action as well as observers of observers. If there is not enough data to forecast data availability, the targeting engine 150 might tend to calculate a low confidence score. The targeting engine 150 is preferably configured to suggest changes that the advertiser 115 may make to increase the confidence score of their actions, conditions and/or terms.

Assuming enough reliable data sources exist, the targeting engine 150 may publish the requested actions, conditions and/or terms to the public by way of a searchable interface for the purpose of matching users with advertisers. The targeting engine 150 may be configured to match the requested actions, conditions and/or terms to one or more users who are immediately capable of satisfying at least one of the requested actions, conditions and/or terms. In some embodiments, the targeting engine 150 is configured to use a forecasting evaluation, a confidence score, and a data source profile to market advertisers to users. For example, when users capable of satisfying the requested actions, conditions and/or terms are matched to advertisers, the users may be emailed, texted or otherwise notified of the offer from an advertiser, and/or users may use a discovery tool such as a directory or search engine to browse matched advertisers and offers whether or not they are currently able to satisfy them. The targeting engine 150 may also market users to advertisers. For example, an advertiser may get an email, text or other communication notifying them of users capable of satisfying their actions, conditions and/or terms as well as all users associated with all satisfaction events, including actors and observers browsable through the advertiser's campaign management interface. The targeting engine 150 may generate a data set, such as a collection of sensor data, possibly collected within a trigger file corresponding to the actions, conditions and/or terms. In an exemplary embodiment a trigger file might include an index of actual sensor and data values that (if present) would indicate the satisfaction of an offer. Of course sensor data is collected continuously over time, and thus the contents of the trigger file might be periodically tested and/or re-tested to determine whether or not any offers have been satisfied. Of course, one offer could have multiple triggers within a trigger file.

As earlier indicated, the sensor data in a trigger file might be used in conjunction with a campaign management engine 109 for deriving confidence/probability testing of offers when submitted by advertisers. Accordingly, a campaign management engine 109 might possess the facility to filter candidate actions and events triggers such that actions below a certain threshold might not even become registered. For example, an advertiser may offer a $50 store credit to users who bring at least two friends to dinner, buy a souvenir item from the gift store, and then write an online review of their meal, within one week of visiting, and assigns at least three or better stars. A trigger file for this offer would include a trigger for presence at the restaurant, a trigger for a party of three or more, a trigger for a non-food item purchase, a trigger for a review, a trigger that the review is within one week of the visit, and a trigger that the review is at least three stars or better. A probability of occurrence of those triggers within the time period can be calculated, and if the probability falls below a threshold, the campaign management engine might suggest an alternative to registering the triggers.

In some instances, multiple users may be involved in satisfying a requested action. For example, one user may be playing the role of advocate or proxy for the advertiser. Another user may be playing the role of consumer or potential consumer of the advertiser's products, services, brands or other information. Multiple advocates may eventually help one consumer before satisfaction of an action. In some cases the participation of multiple advocates is expressed in the offer and corresponding terms and conditions. In such a case it is reasonable that any two or more of the multiple advocates are slated for compensation. Other examples of multiple users being involved in satisfying a requested action include advertiser offers requiring multiple users or new users to be brought to the user/advocate accepting the offer. In fact there exists a class of advocacy offers where the advocate is only rewarded at intervals beyond a single user (e.g. compensation for a first, fifth, seventh, tenth, twentieth, etc new customer) and specific conditions of the offer that require more than one user to satisfy the requested action. For example an advertiser might define an offer with terms and conditions requiring multiple users to display specific interdependent pieces of advertiser-supplied content on their mobile phones at the same time and relative position of other users participating in the satisfaction of the conditions of the offer.

Once one or more users have satisfied the conditions of an offer, the users would have an expectation of rapid remuneration. Thus, in some embodiments, the compensation engine 160 of the cost-per-action engine 110 may allocate and distribute revenue or value due from the advertiser to the contributing parties. The distribution may occur almost immediately after verification of satisfaction of the conditions of the offer. Distribution may occur according to an individual action-specific or offer-specific model of value. The offer-specific or action-specific model may be provided by the advertiser or may be derived by the cost-per-action engine 110 at the time of registration. The compensation engine 160 is discussed in more detail below.

Using the dashboard and applications as shown in FIG. 1D, users can browse, search, self-discover or be introduced to advertiser offers. A user may proactively register an intention to satisfy an offer or action. In such a case, the targeting engine 150 registers and tracks the behavior of the user. A user may also add a particular action to the user's personal action tracking device on the user's computer 145 or on a mobile device 149. In such a case, the user's personal action tracking device may monitor the user's daily activities, periodically sending data to or through one or more sensor networks. The user's personal action tracking device (e.g. a cell phone or smart phone) may possess a man-machine interface capable of suggesting to the user that conditions are present for satisfaction of one or more actions whenever the user encounters opportune environments for known actions and compensation opportunities. In some embodiments, action management and tracking may operate directly on the user's computer 145 or mobile device 149. Alternatively, tracked data may be stored on a remote server (not shown) of the cost-per-action engine 110 or any interconnected data collection and aggregation network. The remote server may have backup and easy access to and from data platforms.

Once one or more users satisfy the conditions of an action, the confidence and satisfaction manager 156 receives the data to evaluate the likelihood of a conclusion of satisfaction. The confidence and satisfaction manager 156 compares the actual data stream around the action with the expected data stream. Based on the comparison, the confidence and satisfaction manager 156 applies a confidence score to the data and the conclusion of satisfaction of the offer. If the confidence score is above a threshold defined by the confidence and satisfaction manager 156, or by an advertiser, then the confidence score is enough to certify the action as being satisfied. The confidence and satisfaction manager 156 may then send the certified action to the compensation engine 160 and any other appropriate device for further processing. The confidence and satisfaction manager 156 may add the transaction and appropriate archived data evidence to a historical data platform on the database 135. On the other hand, if the confidence score of the data supporting a conclusion of satisfaction is not above a threshold defined by the confidence and satisfaction manager 156, or by an advertiser, then the confidence score is deemed not high enough to conclude that the action has been satisfied. The confidence and satisfaction manager 156 may then perform additional processing. For example, the confidence and satisfaction manager 156 might attempt to gather more data, possibly including live observer or other human-based confirmation/satisfaction data. Or the confidence and satisfaction manager 156 might request user confirmation of satisfaction, or the confidence and satisfaction manager 156 might discount or reduce the compensation based on a lower confidence. In some situation of low confidence of satisfaction of the conditions of an offer, the confidence and satisfaction manager 156 might notify the involved user or users, providing detailed specific instructions or suggestions for the users to follow in order to increase the confidence score. Both users 120 and advertisers 115 preferably have an interface (e.g. dashboard) by which to track various actions, confidence scores, percentages toward completion, and other useful statistics and metrics involved in ad copy, ad campaign and system offers and users.

The targeting engine 150 may be configured to suggest appropriate users 120 to the advertiser 115 through the advertiser's account management system. The advertiser 115 may manually or programmatically choose the users. Alternatively, the targeting engine 150 may be configured to automate the service by selecting users 120 likely to be willing and able to satisfy requested actions, conditions and/or terms in real time. For example, advertisers 115 may monitor actions with strict criteria and perhaps alter or lessen the criteria to better match the current stream of users 120 in the real world or online destination that is the subject of the requested action. In some embodiments, the targeting engine 150 gains a greater revenue share for satisfied actions where the targeting engine 150 plays a role, compensation being allocated according to predefined terms or real-time set terms.

In the customer-base expansion context, the targeting engine 150 may compare advertiser customer bases to associated data. The comparison may reveal actual overlap or expected overlap. The targeting engine 150 may rank matching users by likelihood of target or by intimacy of social connections of a target compared to an existing customer or advocate. In some embodiments, the targeting engine 150 may offer this intelligence to users.

Method Overview for Targeting in Cost-Per-Action Advertising

Figure 2A:
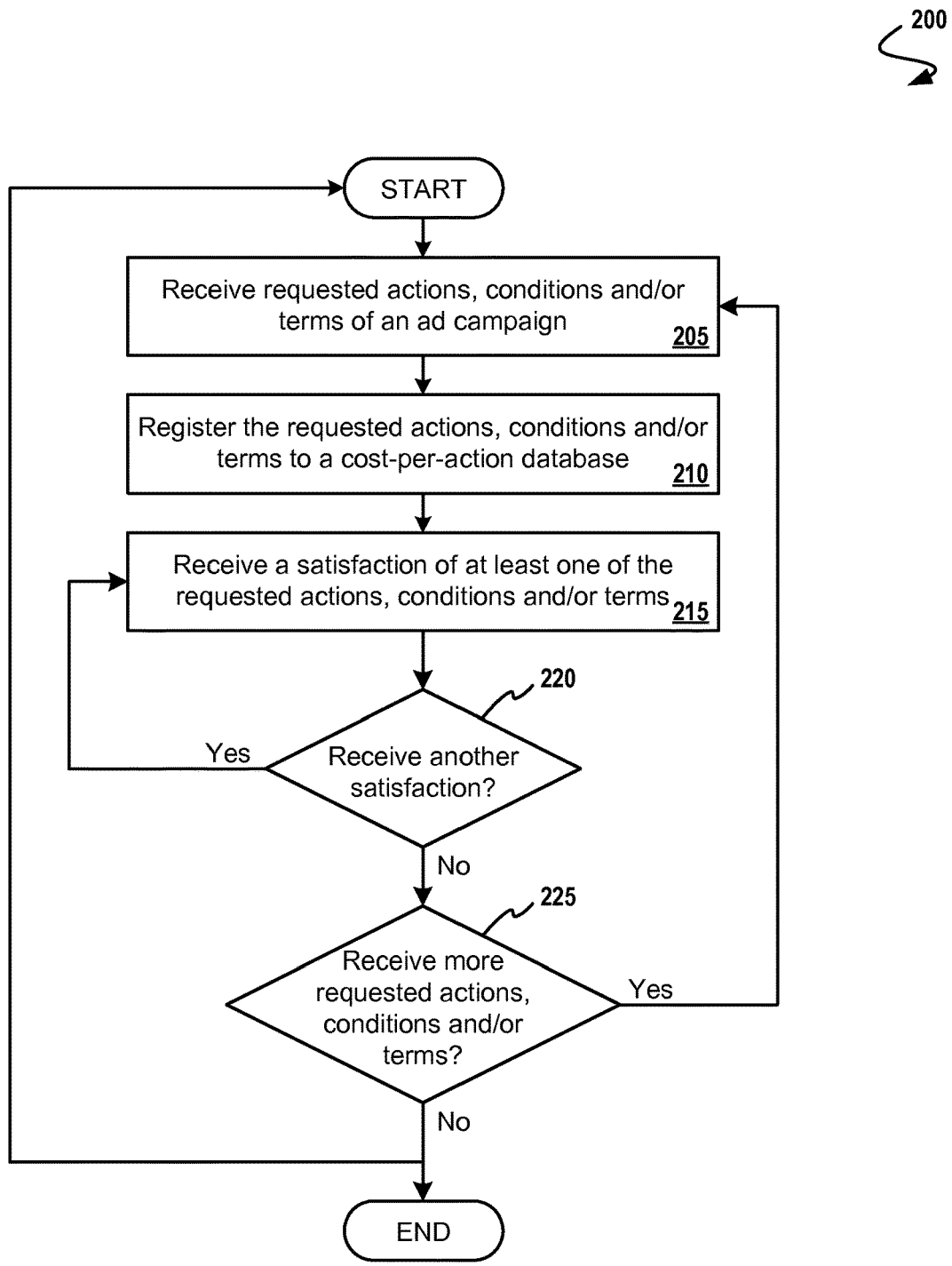
FIG. 2A is a flowchart of a method for targeting in a cost-per-action advertising system, in accordance with some embodiments.

FIG. 2A is a flowchart of a method 200 for targeting in a cost-per-action advertising system, in accordance with some embodiments. The steps of method 200 are preferably carried out by the targeting engine 150 of FIG. 1B. However, other components of system 100 may also be involved with carrying out the steps of method 200.

The method 200 starts in a step 205 where the system receives requested actions, conditions and/or terms of an ad campaign. The requested actions, conditions and/or terms are preferably provided by an advertiser. The method 200 then moves to a step 210 where the system registers the requested actions, conditions and/or terms to a cost-per-action database. The database 135 may be accessible to users 120 to search and browse the various requested actions, conditions and/or terms. Next, in a step 215, the system receives a satisfaction of at least one of the requested actions, conditions and/or terms.

The method 200 then proceeds to a decision operation 220 where the system determines if another satisfaction is being received. If another satisfaction is being received, then the method 200 continues with the step 215 where the system receives another satisfaction of at least one of the requested actions, conditions and/or terms. However, if the system determine in the decision operation 220 that another satisfaction is not being received, then the method 200 continues to another decision operation 225.

In the decision operation 225, the system determines if more requested actions, conditions and/or terms are being received. If more actions and/or terms are being received, then the system continues with the step 205 where the system receives requested actions, conditions and/or terms. However, if the system determines in the decision operation 225 that more requested actions, conditions and/or terms are not being received, then the method 200 concludes.

Note that the method 200 may include other details and steps that are not discussed in this method overview. Other details and steps are discussed with reference to the appropriate figures and may be a part of the method 200, depending on the embodiment.

Embodiments of a Compensating Engine in Cost-Per-Action Advertising

Referring to FIG. 1B, the compensation engine 160 of the cost-per-action engine 110 may be configured to allow an entity, such as an advertiser 115, to compensate a user 120 for satisfying requested actions, conditions and/or terms. The compensation engine 160 enables a variety of compensation template models including monetary and non-monetary forms of compensation. The compensation engine 160 also enables do-it-yourself, explicit value models for revenue-sharing among experts, advocates, marketplaces, networks and users.

Compensation may be monetary, but does not necessarily have to be monetary. For example, the requested actions, conditions and/or terms may define the compensation as providing some sort of other incentive. An incentive provided as compensation may be, for example, helping to save the rainforest; gaining access to an exclusive club, reputation, ranking or level; gaining access to specialized or exclusive content; or meeting a particular celebrity.

The compensation engine 160 may be configured to track all active actions, terms and conditions, and triggers and goals for multiple users or user advocates who may help a consumer user before satisfaction of a requested action in the marketplace of marketplaces 125. The compensation engine 160 allocates data structures in real-time and dynamically changes allocation of computing resources based upon changes in the campaign and/or changes in data from any/all sensor networks. Eventually, the compensation engine 160 may distribute any revenue to the contributing parties in accordance with the terms of an offer.

The compensation engine 160 may be configured to debit an account of an advertiser 115 due to a confirmed satisfaction. Such debiting is based on the requested actions, conditions and/or terms provided by the advertiser 115 as early as when the campaign is defined. The compensation engine 160 may also be configured to credit an account of a user 120 who is due monetary remuneration.

The compensation engine 160 is the intelligence layer responsible for allocating the revenue collected from advertisers in the normal operation of the cost-per-action engine 110. In simple models, certain actions have a predetermined fee. In more complex models, the fee may be variable, depending on context or other advertiser or criteria established by the cost-per-action engine 110.

The allocation models may be derived from a template. The template may be an individual transaction-specific model or a trigger-specific or action-specific model of value for requested actions, conditions and/or terms. The requested actions, conditions and/or terms are typically provided by an advertiser 115. The compensation engine 160 may also be operable to manage seniority designations or distribution agreements among users. For example, the terms of an advertiser's offer may specify that multiple users will split any compensation in a ratio based upon their relative rank on another third-party network (e.g. an eBay Seller score). Or for example, the terms of an advertiser's offer may specify a split of any compensation to a group of users of known association (e.g. friends, co-workers, network associates or co-members, franchises or co-marketing partners). The compensation engine 160 may provide other manners of prioritization instructions as well including user-specified compensation instructions. For example, compensation due on the CPA network might be converted into online game credit at a specific game vendor (e.g. a game vendor who participates with the CPA network operator to enable this compensation option for users 120).

In some embodiments, the compensation engine 160 may be configured to execute predefined models on behalf of an advertiser 115. The compensation engine 160 may then derive models for any and all non-explicitly associated models of revenue-sharing among the participants of the cost-per-action engine 110. The associated models may include, without limitation, formulation of the action as relevant, pricing of the action, identification of users likely to take action, multiple action tracking, multiple advocate tracking, action satisfaction processing, goal resolution scores, and allocation of compensation. The allocation of compensation may be, for example, a proportionate percentage of compensation to each party (e.g. advertiser) based upon the relative relevance and impact of each party's contribution to relevance and impact to satisfaction of actions and goal achievements. Relevance might be scored with respect to alignment with an advertiser's goal as may have been expressed within the advertiser's requested actions, conditions and/or terms. Impact might be measured with respect to actual numbers of sensed events (e.g. a product review got 1000 hits), and reputation scores (e.g. the persons underlying the 1000 hits had an average reputation score of 8). In some embodiments, the compensation engine 160 may be configured to derive a theoretical model based upon an actual model. In such a case, all parties (e.g. advertisers) typically agree that the actual campaign data record is the best instrument for codifying allocation, and might be preferred by the parties even over a prior agreement using a different instrument. An approach relying on the actual campaign data record as the best instrument for codifying allocation might be advantageous to advertisers because the approach tends to codify allocations relative to measurable results, and tends to support the use of mutually agreed techniques for measurement. The approach relying on the actual campaign data record as the best instrument for codifying allocation might also be advantageous to users because objective, merit-related performance measurements allow a user to improve the user's reputation in an objective and verifiable manner. The objective and verifiable reputation measurement may allow the user to increase the user's revenue share in revenue-sharing situations such as when the CPA network operator or advertiser increases compensation for satisfying users of higher ranks or reputations. The compensation engine 160 may be configured to model type of contact, duration, location, existence of follow up, transfer of data, marketing materials, and/or other action evidence, and these conditions may be actual conditions on satisfaction, or simply weighting factors in a compensation model, depending on the campaign and offer of that specific advertiser. The compensation engine 160 may use the model to support an increase or decrease in revenue share for each user along a temporally-relevant period before a satisfaction.

Every action's conditions, and therefore its offer, has its own relevant time periods as specified by the advertiser. These time periods may be associated with the sales and customer service cycles of the product, service, brand or other information being promoted, or may be a function of the CPA network and marketplace. Alternatively, in cases where the advertiser does not specify a time period, the compensation engine 160 may be configured to recommend or derive time periods from data in the cost-per-action engine 110 that relates to the average sales cycle for the product, service or industry.

Figure 1G:
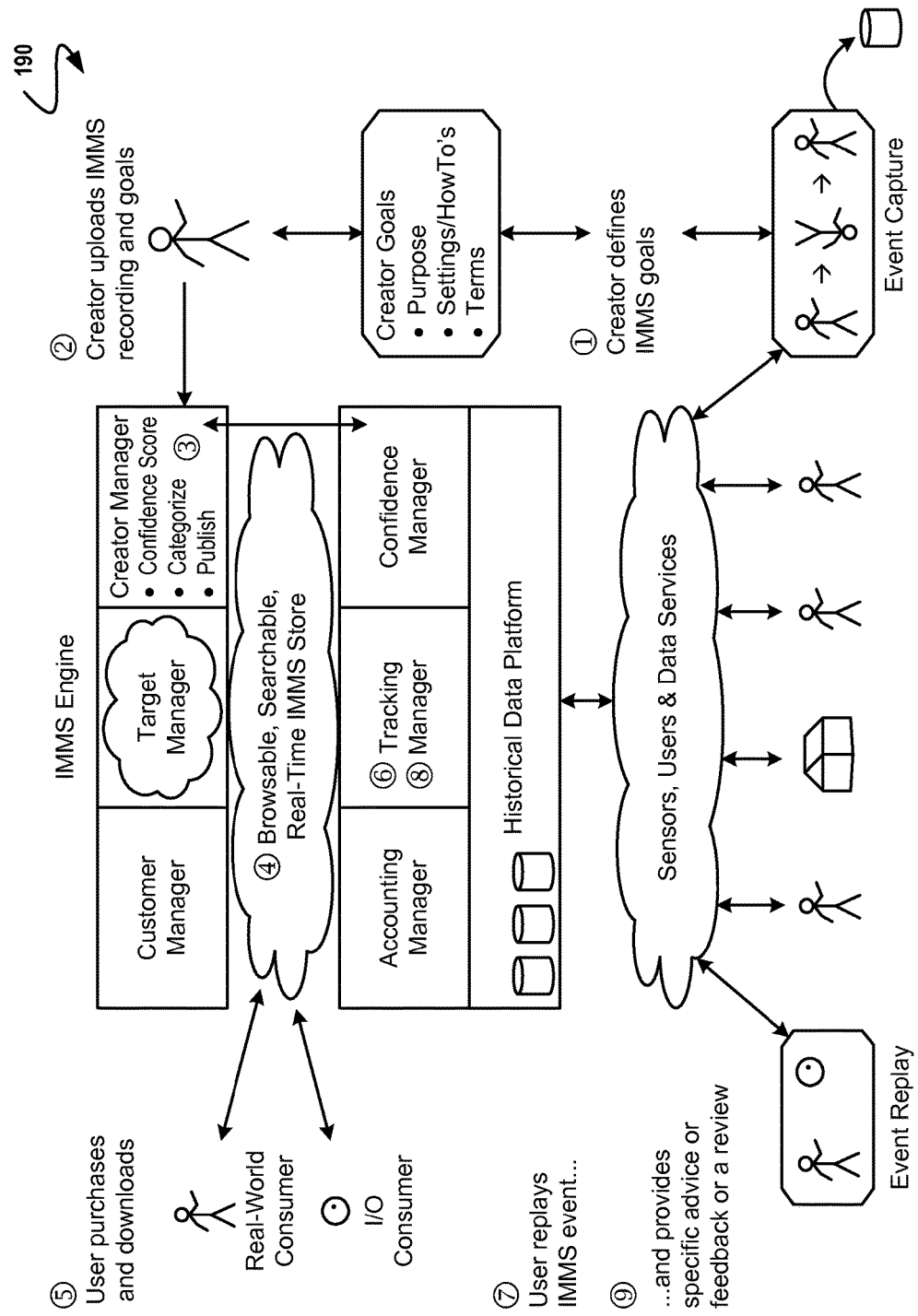
FIG. 1G is a block diagram of a cost-per-action system including a sensor recording marketplace and creators, in accordance with some embodiments.
Figure 2B:
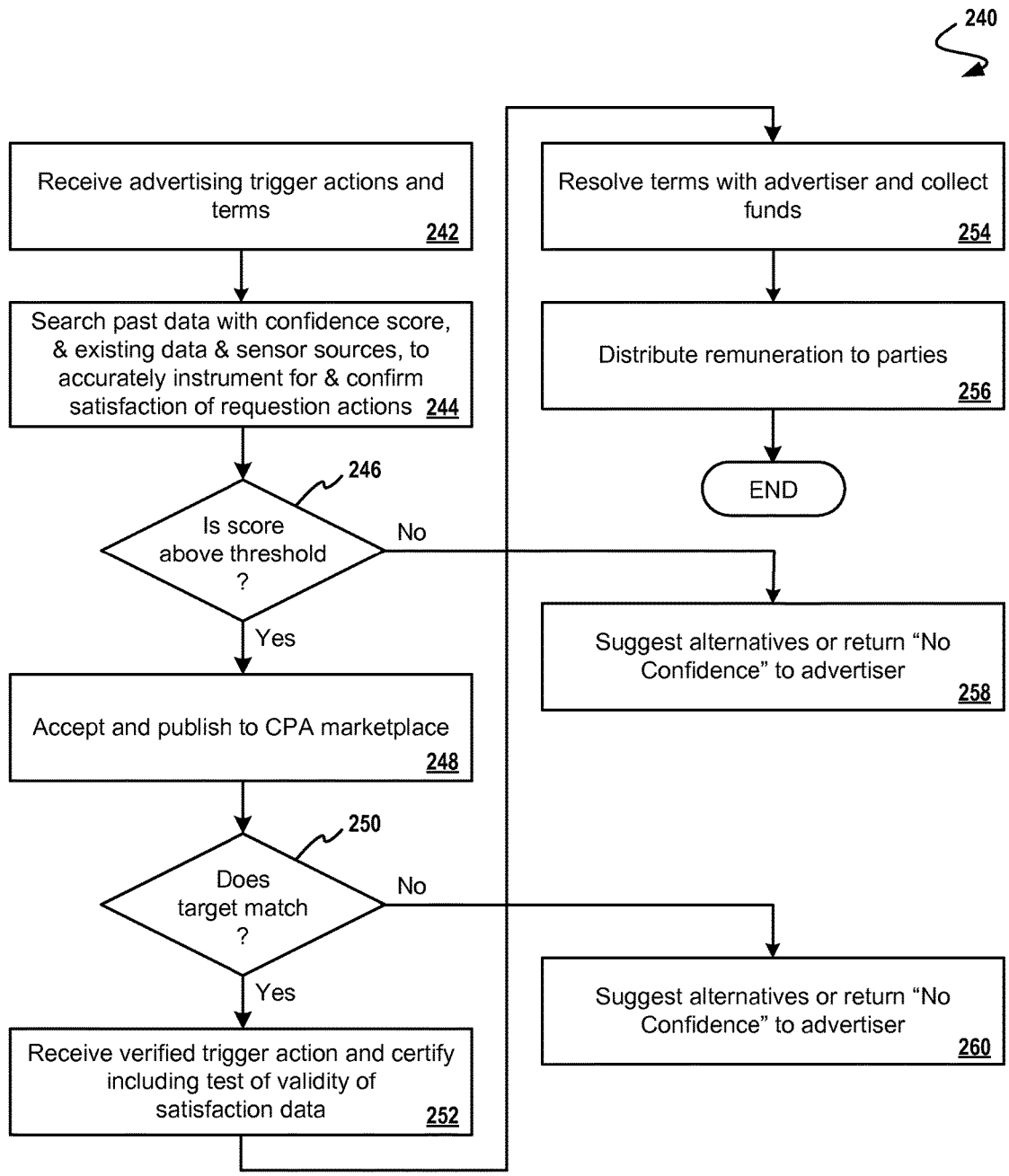
FIG. 2B is a flowchart of a method for targeting and verifying in a cost-per-action advertising system, in accordance with some embodiments.

FIG. 2B is a flowchart of a method for targeting and verifying in a cost-per-action advertising system, according to one embodiment. As an option, the present method 240 may be implemented in the context of the architecture and functionality of FIG. 1A through FIG. 2A. Of course, however, the method 240 or any operation therein may be carried out in any desired environment. As shown, the method 240 initiates by receiving advertiser actions, conditions, and/or terms (see operation 242), and searching past data and sensor sources in order to confirm through a confidence score the ability to instrument for verification of the satisfaction of the advertiser's actions according to the advertiser's terms and conditions (see operation 244). If the confidence score is below a threshold (see decision 246) then the advertiser might receive suggestions of alternatives and/or a low confidence score (see operation 258). On the other hand, when the confidence score is acceptably high, then the cost-per-action campaign settings are published to the CPA marketplace (see operation 248). Of course it is possible that a cost-per-action campaign setting might present some impossibly narrow or improbably narrow target for matching. Thus, at some point in time, the method 240 might detect that there is no match (see decision 250) and method 240 might suggest alternatives to the advertiser (see decision 260). Conversely, if a match is detected, the method 240 sets about to verify and certify that the action has been performed according to the corresponding terms and conditions (see operation 252). As earlier indicated, it is possible that some terms and conditions are not met precisely, thus it is possible that method 240 will resolve the actually satisfied and certified satisfaction with the advertiser before collecting funds (see operation 254) and distributing remuneration to the parties (see operation 256).

Figure 2C:
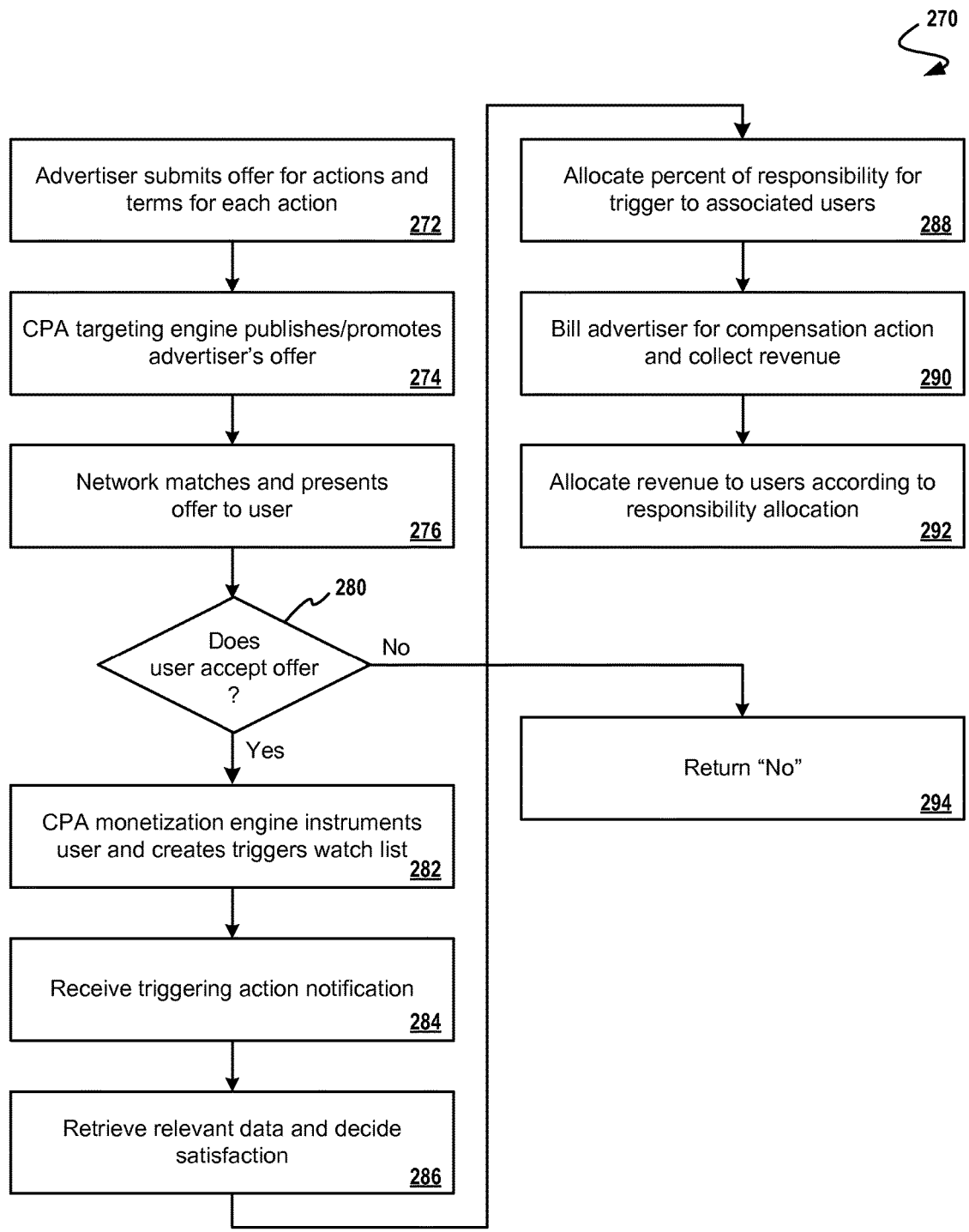
FIG. 2C is a flowchart of a method for targeting and compensating in a cost-per-action advertising, in accordance with some embodiments.

FIG. 2C is a flowchart of a method for targeting and compensating in a cost-per-action system, according to one embodiment. As an option, the present method 270 may be implemented in the context of the architecture and functionality of FIG. 1A through FIG. 2B. Of course, however, the method 270 or any operation therein may be carried out in any desired environment. As shown, the method 270 initiates by receiving actions, conditions, and/or terms from the advertiser (see operation 272). Based on any techniques, including techniques presented in the discussion of method 240, the method 270 proceeds to perform operations for publishing and promoting the advertiser's cost-per-action offer (see operation 274). At some time later (time scale not shown) the method 270 performs matching of offers to users (see operation 276), and presents the offer or offers to a user or users using any known method. The user may or may not accept the terms of the offer (see decision 280) or not. In situations when the user does accept the offer, operation 282 serves for instrumenting the user and for creating one or more trigger lists. In situations when the user does not accept the offer, operation 294 serves to indicate the user's non-acceptance. Again, at some later time, operation 284 serves for notifying within the cost-per-action system that a trigger or multiple triggers have been detected, and the cost-per-action engine 110 retrieves relevance data together with any other sensor data to decide satisfaction (see operation 286). In some cases multiple users (e.g. actors, advocates, observers, etc) might be involved in some way in the satisfaction determination, and in such cases some percentage of responsibility for satisfaction is allocated to the users (see operation 288). The operation 290 serves for billing the advertiser for the satisfaction of the action, and then collecting revenue. The revenue can then be allocated to the users in accordance with the responsibility allocation (see operation 292).

Method Overview for Compensating in Cost-Per-Action Advertising

Figure 3A:
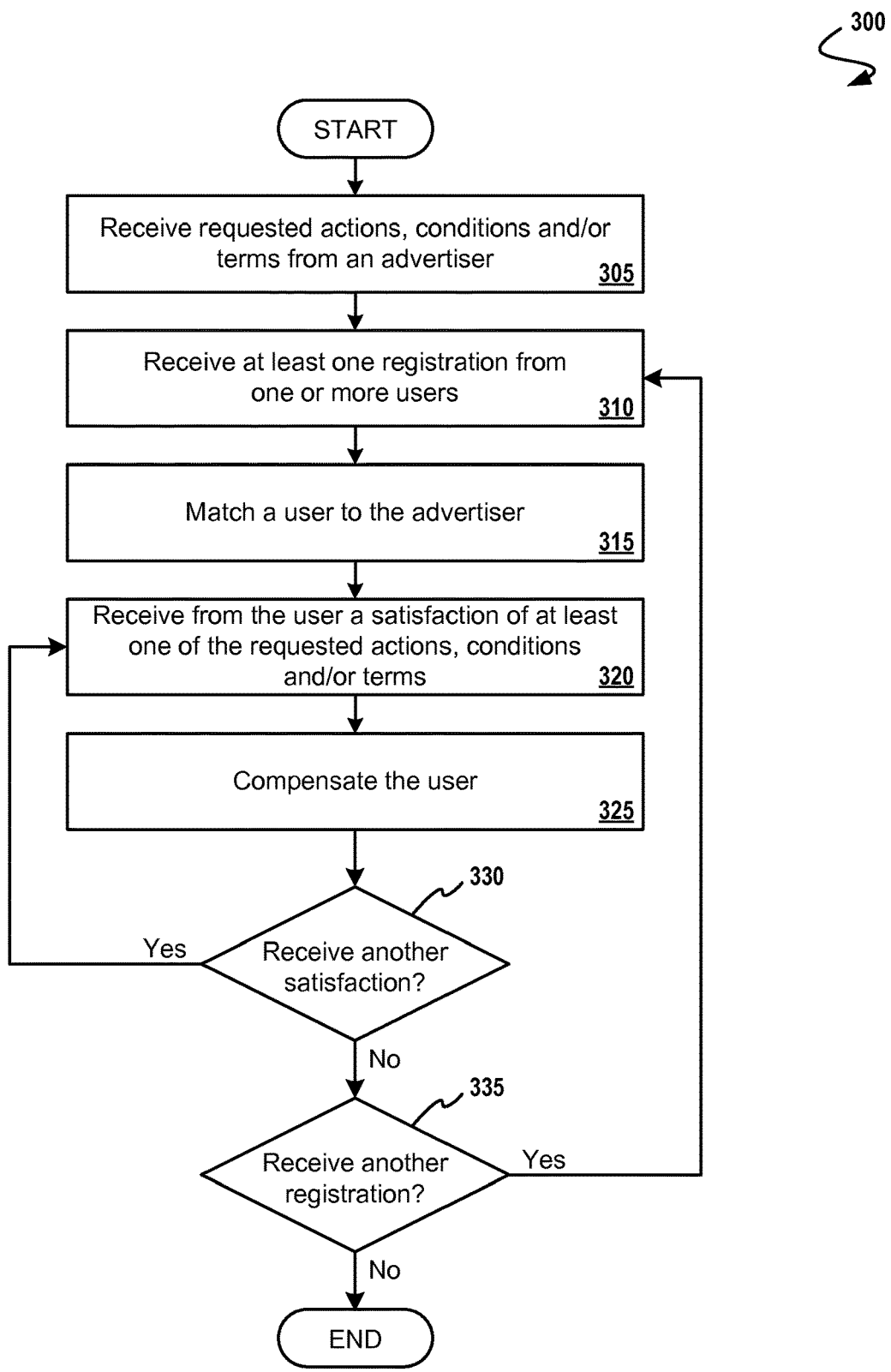
FIG. 3A is a flowchart of a method for compensating in a cost-per-action advertising system, in accordance with some embodiments.

FIG. 3A is a flowchart of a method 300 for compensating in a cost-per-action advertising system, in accordance with some embodiments. The steps of the method 300 are preferably carried out by the compensation engine 160 of FIG. 1B. However, other components of the system 100 may also be involved with carrying out the steps of the method 300.

The method 300 starts in a step 305 where the method receives requested actions, conditions and/or terms from an advertiser. The requested actions, conditions and/or terms preferably define how users may satisfy requested actions, conditions and/or terms of an ad campaign. The requested actions, conditions and/or terms may also define how users may be compensated for satisfying requested actions, conditions and/or terms. The method 300 then moves to a step 310 where the method receives a registration from a user. Next, in a step 315, the method matches the user to the advertiser. The method 300 then proceeds to a step 320 where the method receives from the user a satisfaction of at least one of the requested actions, conditions and/or terms. Then, in a step 325, the method compensates the user for the satisfaction. The compensation may be monetary, but does not necessarily have to be monetary.

Next, in a decision operation 330, the method determines if another satisfaction is being received. If another satisfaction is being received, then the method 300 continues with the step 320 where the method receives from the user another satisfaction of at least one of the requested actions, conditions and/or terms. However, if the method determines in the decision operation 330 that another satisfaction is not being received, then the method 300 continues to another decision operation 335.

In the decision operation 335, the method determines if another registration is being received from a user. If another registration is being received from a user, then the method 300 continues with the step 310 where the method receives at least one registration from one or more users. However, if it is determined in the decision operation 335 that another registration is not being received, then the method 300 concludes.

Note that the method 300 may include other details and steps that are not discussed in this method overview. Other details and steps are discussed with reference to the appropriate figures and may be a part of the method 300, depending on the embodiment.

Figure 3B:
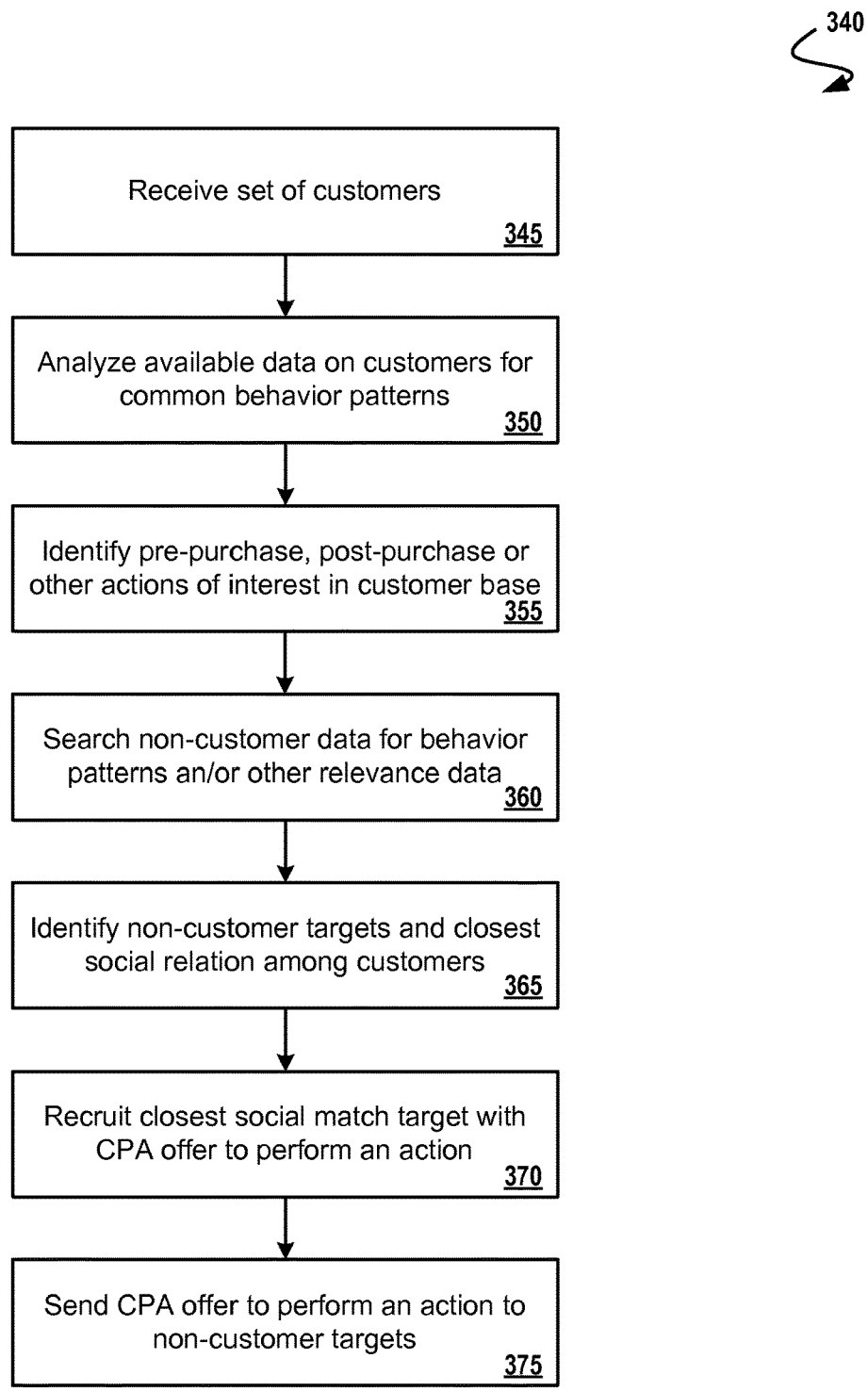
FIG. 3B is a flowchart of a method for matching advertisers to non-customers in a cost-per-action advertising system, in accordance with some embodiments.

FIG. 3B is a flowchart of a method for matching advertisers to non-customers in a cost-per-action system, according to one embodiment. As an option, the present method 340 may be implemented in the context of the architecture and functionality of FIG. 1A through FIG. 3A. Of course, however, the method 340 or any operation therein may be carried out in any desired environment. As shown, the method 340 seeks to compensate users identified through social matching. Of course, given a set of requested actions, conditions, and/or terms (see operation 305 of FIG. 3A), an instant set of users (e.g. customers) that satisfy the target (e.g. a predicate such as Age=30, State=California) can be generated (see operation 345). However there may be other groups of candidate customers, which groups might be identified through matching based on patterns beyond the target predicates. As shown, operations 350, 355, 360, and 365 serve to identify such candidate customer groups by analyzing relevance data patterns (operation 350), identifying pre-purchase events, post-purchase events or other actions of interest (operation 355), searching non-customer data for behavior patterns (operation 360), identifying non-customer target candidates (operation 360), and ranking target candidates using any of a range of social metrics (operation 365). When target candidates have been identified, recruiting the closest matched candidates or candidate groups to perform the requested action or actions (operation 370). Of course, the form recruiting may take many forms. For example, recruiting the closest matched candidates might include inviting a candidate by bringing to the candidate's attention the terms and conditions of an offer. Once a user is successfully recruited, at least to the extent that the user accepts an offer (see decision 280 of FIG. 2C), then the user's actions are monitored (see operation 375) and performance of any actions included in the offer terms and conditions might be verified. Again, the action of recruiting may include recruiting based on specific social relations, and in some cases, the offer may itself indicate an advertiser's preference for recruiting based on some specific social relation. For example, an offer in a campaign might indicate a preference for recruiting a non-customer friend of a customer. Further, an offer might indicate a social relation in combination with other conditions. For example, an offer might be characterized as, "Enjoy a 50% off entrée when you bring a friend to the Union Square Diner before 9 pm". As earlier indicated, analysis of relevance data might be included in steps leading to identifying candidates, and such relevance data might include real-time data, such as current location. As such, a non-customer friend of a customer of the "Union Square Diner" might be presented with the aforementioned offer at the moment in time when the non-customer friend of a customer of the "Union Square Diner", and the customer himself are both in proximity of the "Union Square Diner".

Figure 3C:
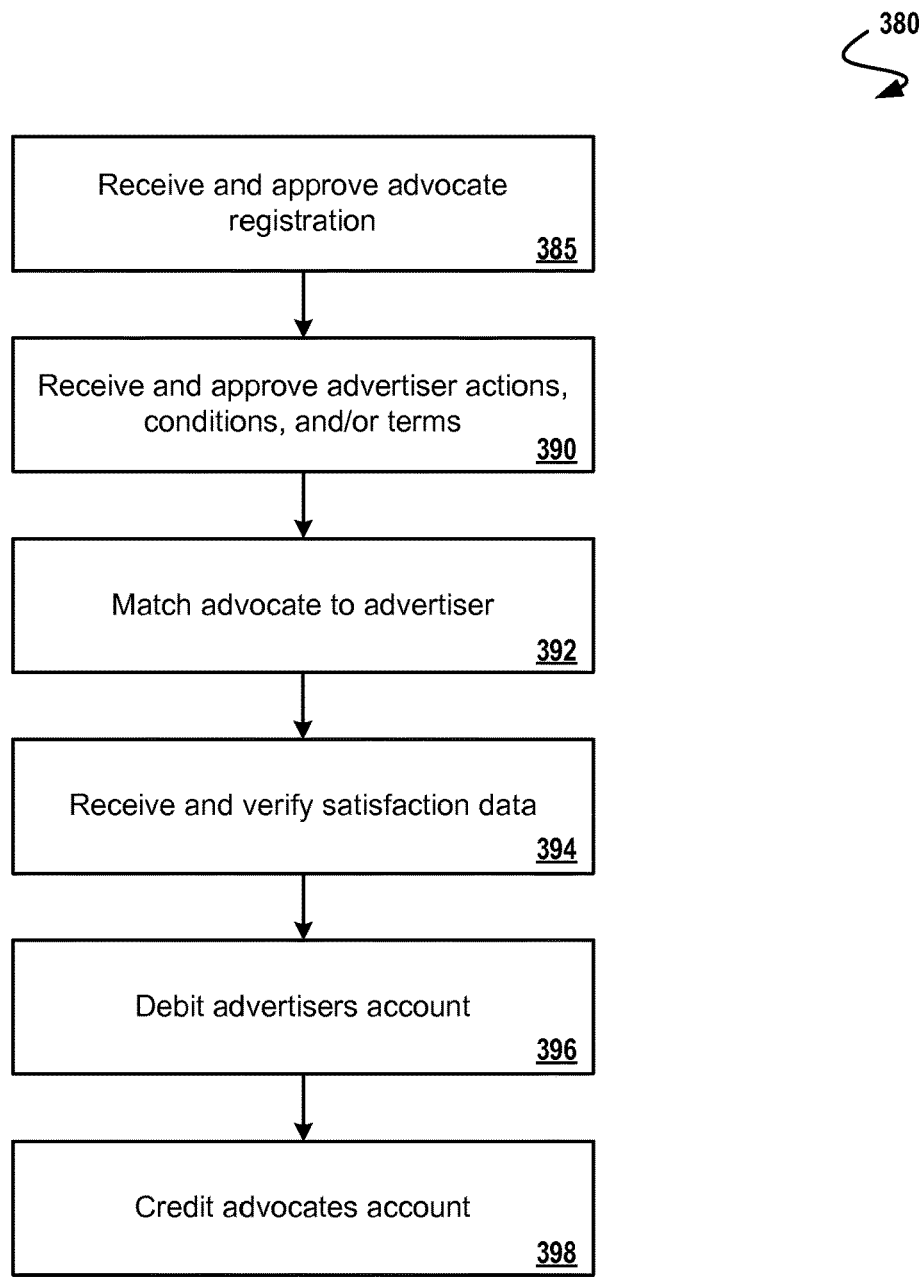
FIG. 3C is a flowchart of a method for compensating an advocate based on targeting in a cost-per-action advertising system, in accordance with some embodiments.

FIG. 3C is a flowchart of a method for compensating an advocate based on targeting in a cost-per-action system, according to one embodiment. As an option, the present method 380 may be implemented in the context of the architecture and functionality of FIG. 1A through FIG. 3B. Of course, however, the method 380 or any operation therein may be carried out in any desired environment. As shown, the method 380 initiates an operation 385 by receiving and approving an advocate's registration. At any time, not necessarily in the specific sequence shown, an advertiser's actions, conditions, and/or terms might be registered by system 100 (e.g. see operation 210 of FIG. 2A), which registration might be matched to a registered advocate (see operation 392). As is depicted in the flowchart of FIG. 2C, actions are received and verified for satisfaction (see operation 394), allocated to possibly multiple responsible users (i.e. including one or more advocates), and the transaction might be completed by debiting the advertiser's account (see operation 396) and crediting the advocates account (see operation 398).

Embodiments of an IMMS Marketplace in Cost-Per-Action Advertising

Referring now again to FIG. 1B, the IMMS marketplace 108 of the system 100 may be configured to allow an entity, such as a portal/operator 111 as shown in FIG. 1C, to provide a marketplace for user sensor recordings of any kind. Accordingly, a cost-per-action system 110 may be configured to interface to a public trading space for multimedia sensor recordings of any kind, possibly through network of networks 105, which network of networks 105 might include a sensor network 130.

The IMMS marketplace 108 is configured to provide a new form of web-based economy trading in digital objects comprising a series of tagged and coded sensor recordings. The sensor recordings may be made by one user and then replayed and experienced by another user through the cost-per-action system 100, including a public directory, a database 135 and a search interface. The sensor recordings may be recordings on any object, topic, person, place and/or time, including the means for the recordings to be offered for sale as downloadable files. In some embodiments, the cost-per-action engine 110 includes a connection to advertisers for matching sponsored content and ad copies to the viewable pages or free downloads that present a pre-, post- or interstitial ad with the sensor recording.

In some embodiments, as further discussed infra, the IMMS marketplace 108 may be connected to an active network of sensors, including without limitation user data, third-party data sources around the interests of users, the possession, inventory and libraries of users, the histories in web-surfing, search histories, email and IM archives, transaction histories such as credit or debit card uses, time-space path proxy data generated by idle or passive co-present devices, etc. Accordingly, the IMMS marketplace 108 may use pattern matching among all users in the network to rank each user according to their likelihood to purchase every recording offered through the marketplace. The cost-per-action system 100 may then monetize this data in premium services to authors and/or consumers. The cost-per-action system 100 may also provide an enhanced matching function.

In addition to providing a public trading space for multimedia sensor recordings of any kind, one embodiment of an IMMS marketplace 108 includes a series of specific templates (or syntax rules) for describing sensor recordings. For example, the templates or syntax rules facilitate expressing characteristics of the sensor recording. Such characteristics might include input sensor type (e.g. a video camera, a microphone, a musical instrument, a Wii transducer, etc) together with any sensor recording objectives, values, goals, offers and any other characteristics as may be of importance to creators of recordings. For example, an athlete training in the hurdles could record his hurdle performance using a sensory device embedded in his apparel as he runs (for example) the 110-meter hurdle event. The athlete could then post the sensor recording to the IMMS marketplace, together with an offer to pay remuneration to anyone who can help improve his performance. Continuing this example, perhaps the local college track and field coach is qualified to offer advice on running hurdle events. So in this instance, the athlete/user posts the sensor recording to the IMMS marketplace in expectation that an expert might provide analysis and direction. As may be apparent from this example, such an expert can provide analysis and direction without being physically with the user.

Continuing disclosure with another example, consider the instance where the expert is doing the recording and posting their recording to an IMMS marketplace for a download (possibly requiring agreement to various terms and conditions). For example, a retired Olympic hurdler might post recordings of their gold-winning run in the IMMS marketplace such that fans or serious athletes can download and play and replay the recording on their devices. Playback could take many forms depending on the types of actions being desired or the value ranges of the sensors involved. Playback mode could also be continuous (i.e. as recorded), or looped so as to enable portions or sub-portions to be sampled or replayed as part of a training or practice regimen. In some embodiments the IMMS recording is treated much like a downloaded music file from a music service such as iTunes, and in fact, IMMS recordings could become another category on digital download hubs such as iTunes.

In other embodiments, the IMMS recording includes a monitoring application that is directed to users who wish to make their own recreation attempts of downloaded recordings. In this case, the IMMS marketplace and/or supporting components might include additional facilities for real-time communication and sensor monitoring of a user's recreations. For example, a customer of the Olympic athlete's recording could embed the customer's own similarly-configured sensing device in his apparel and run hurdles with sensory feedback being delivered in real-time. Strictly as an example, such a scenario might include biofeedback such as a buzzing signal for confirming timing of each hurdle or step, etc. Such a feedback mechanism might be defined by the user in order that the user may receive a more vivid experience of the recording.

In another scenario, the monitoring service might include various training features. Such features might include specialized software programs (possibly contained within the download) to compare user's recordings with purchased recordings. Some such specialized software programs provide code for graphically representing the differences between the two recordings for the user to explore which values were different, and when and how. Some of these training applications might also include embedded models for improvements, and possibly even a virtual trainer operable for suggesting specific expert-provided instructions for improving toward the desired result. Driven by changes in the sensory values of the user over several tries, and in comparison to the downloaded recording, the application might suggest specific changes for the user to consider. Strictly as an example, a virtual training might suggest, "You need to increase your stride length," or "Try to increase your stride by practicing my favorite drills I learned at the Olympic training center."

In another embodiment, an IMMS marketplace cooperates with a target manager that is connected to an active network of sensors. Augmenting the earlier description of sensor networks, nodes within a sensor network might be operable to return user data and third-party data sources related to the interests of users, and might further be able to provide indications of the contents of libraries of users, and might still further be able to provide the web-surfing histories, search histories, email and IM archives, etc of a given user. Thus, an IMMS marketplace cooperating with a target manager might use pattern matching or other comparison techniques to compare against any other network users in order to rank each compared user according to (for example) likelihood to purchase a given recording offered through the marketplace. This data can then be monetized through premium services offered to creators or consumers. Of course, such a matching capability might be used in any embodiment as an enhanced matching function of the marketplace.

In some instances, the IMMS marketplace engine, possibly in cooperation with a target manager, might use historical data and trends to identify relevance data pattern matching of recordings to users, users to recordings, users to experts and users to monitoring services.

The target manager can provide services in several contexts such as (i) automatic suggesting of users as targets for the creator's recordings, (ii) identifying closest competitor intelligence, and/or (iii) performing market research on similar recordings. Also, the target manager might analyze historical data of the user against available recordings to rank the best matches for that user based upon relevance data similarity (i.e. comparing the relevance data profile of the user to the relevance data profile of the recording). The user can be advised about any/all potential matches, using any known technique for automatic delivery, or (if so specified) only upon request. In some embodiments, the continuing growth of available recordings enables a real-time alert service that notifies users when a potentially relevant recording becomes available. In these instances, the marketplace or other responsible party may take a portion of any revenue generated through the lead. As can now be readily understood, embodiments of the IMMS marketplace allows users to use interactive multimedia sensing to look for and purchase products and services. Further, embodiments facilitate such features as follows:

Portal/operator tracking of user activity through movement and multimedia sensing.

Users using a myriad of movements, audio, video and image capture as alternative forms of query as a basis for getting recommendations.

Users offering feedback on the query/recommendation results.

Performing multimedia sensing condition matching between users and advertisers.

Determining multimedia sensing conditions.

Mining multimedia sensing conditions.

Of course accurately-tagged multimedia facilitates high-confidence matching. To facilitate tagging, some embodiments provide game-play type interfaces to mine the multimedia sensing conditions and the metadata surrounding the conditions. The portal/operator might engage the user with a series of multimedia sensing exercises and have the user tag them appropriately. Similar in concept to Google's "Image Labeler", embodiments might ask multiple users to tag or otherwise produce metadata.

FIG. 1G is a block diagram of a system 190 including a sensor recording marketplace in interaction with creators, in accordance with some embodiments. Referring to FIG. 1G, a possible usage model might proceed as follows:

A creator makes an IMMS recording using any form of event or sequence of sensor data recording.

1. The creator establishes a regime for the public posting, possibly incorporating any description of purpose, and recommended settings and/or instructions on how to use the IMMS recording, and possibly including terms and conditions of use.
2. The creator uploads the IMMS recording and any attachments, possibly including a regime for terms and conditions of use.
3. The creator manager module analyses the uploaded IMMS recording, categorizes the recording, and publishes it to the IMMS marketplace.
4. A user drawn from any pool browses or searches the IMMS recordings via the IMMS store.
5. A user purchases and downloads the IMMS recording and any attachments.
6. A tracking manager begins recording events as pertains to the user's usage of the IMMS recording.
7. The user replays the IMMS recording.
8. A tracking manager continues recording events as pertains to the user's usage of the IMMS recording.
9. The user provides advice or feedback or a review resulting from the playback.

Another embodiment enables users to use interactive multimedia sensing activities to obtain recommendations on products and services, search query results, incentives from advertisers and/or entertainment through game play.

Example Scenario D

Joe is looking for a vocal instructor. He sings into the microphone of his mobile device.

The system matches his voice patterns with the voice or pitch conditions set by vocal coaches registered into the system.

The system uses voice/audio recognition technology to decode Joe's input.

The system matches the decoded data with data from the database.

The system uses the standard relevancy matching algorithms to find the closest matching audio pattern from advertisers, thus a vocal instructor is matched.

Example Scenario E

Jane is looking for the right kind of running shoes.

Jane follows the Nike instructions to run in place with her mobile sensor device in hand.

The system gauges her performance through the device and makes shoe recommendations based on her movements and achievement in the given duration.

Example Scenario F

Janice is looking for a matching sofa for her living room.

Janice takes a video of her living room and sends it to Ikea. The system will decipher the video using image recognition technology to garner the appropriate color and pattern and make suggestions from an Ikea catalog.

Janice browses the Ikea catalog and every time a product that matches her requirements is rendered, (whether implicit or explicit), the system sends her a visual alert.

The system 190 provides query-relevancy-to-user rankings by creating user-relevancy algorithms. The algorithms provide a computational method to determine relevancy so that the system can automatically compute the right match for the user. The system uses the user-implicit and -explicit information to evaluate query relevancy to the user. The system does this by aggregating explicit user information with implicit user information to formulate relevancy-to-user ranking. If the query results in an overall score above a certain threshold, the system will include the result in the pool of query results (that is, queries with scores beneath a specific threshold would be filtered out).

In one embodiment, the system supports a series of controls (e.g. dials, sliders, etc) that allows users to specify different spectrums of relevancy, and for users to characterize such relevancy as specialized (stricter) or relaxed (not as strict). The system may include social, temporal, spatial and categorical controls. Sample spectrums are shown in the following table.

| Control | Spectrum |
| --- | --- |
| | More Specialized------------------------------------More Relaxed |
| Social | Me - Friends - Friends-of-Friends - Anybody |
| Spatial | Here - Feet - Blocks - A Few Miles - Many Miles |
| Temporal | Now - A Little Later - Much Later - Very Much Later |
| | Infrequently - Sometimes - Fairly Frequently - All the Time |

Continuing with possible embodiments, examples of a sensor recording include, without limitation, a monitoring service, a single sensor recording, a series of sensor recordings, the results in value and significance to an activity, a skill such as playing an instrument, singing, running, jumping, a golf swing, a dance move, any human activity, any human processes, a training technique for running, sensor recordings offered by advertisers 115, sensor recordings offered by users 120 as a request action from an advertiser, and other recordings. The terms-of-use for a sensor recording offered for sale through the IMMS marketplace 108 may include, for example but without limitation, the following information: a one-time fee, an ongoing use-based monetary fee, a recurring subscription fee, a registration or membership fee, an attribution requirement, a credit cost, award points cost, and/or travel miles credit cost associated with the recording. For example, a sensor recording of a dancer recreating a famous dance may be one-time priced to initially download and play but require an additional per-use or subscription fee in order to enable upload and comparison of user-generated dance recreation attempts. In some embodiments, the cost-per-action engine 110 may be configured to match recordings to likely consumers on behalf of users 120, advertisers 115 or the operator of the cost-per-action engine 110.

In addition to the actual sensor recording or multimedia recording, a sensor recording may include a sensor recording model (e.g. meta-information, characteristics, URLs, other data items, etc) pertaining to the sensor recording's creation, creator, customers, commentators and terms. For example, information about the context of the original recording may be included with the registered sensor recording. Such meta-information might include where recorded, when recorded, why recorded, relationship to any other recordings, what was recorded, position of the creating sensor or user, position of an object associated to the recording, (e.g. a golf club brand), velocity of an object, direction of an object, acceleration of an object, biometrics of the creator or associated user (e.g. heart rate of a dancer and/or partner) and any other information pertinent to the sensory recording.

In some embodiments, the IMMS marketplace 108 may be configured to use historical data and trends to identify relevance data pattern matching of recordings to users. Alternatively, the IMMS marketplace 108 may be configured to use historical data and trends to identify relevance data pattern matching of users to recordings and/or experts and/or ad-on monitoring services.

Figure 4A:
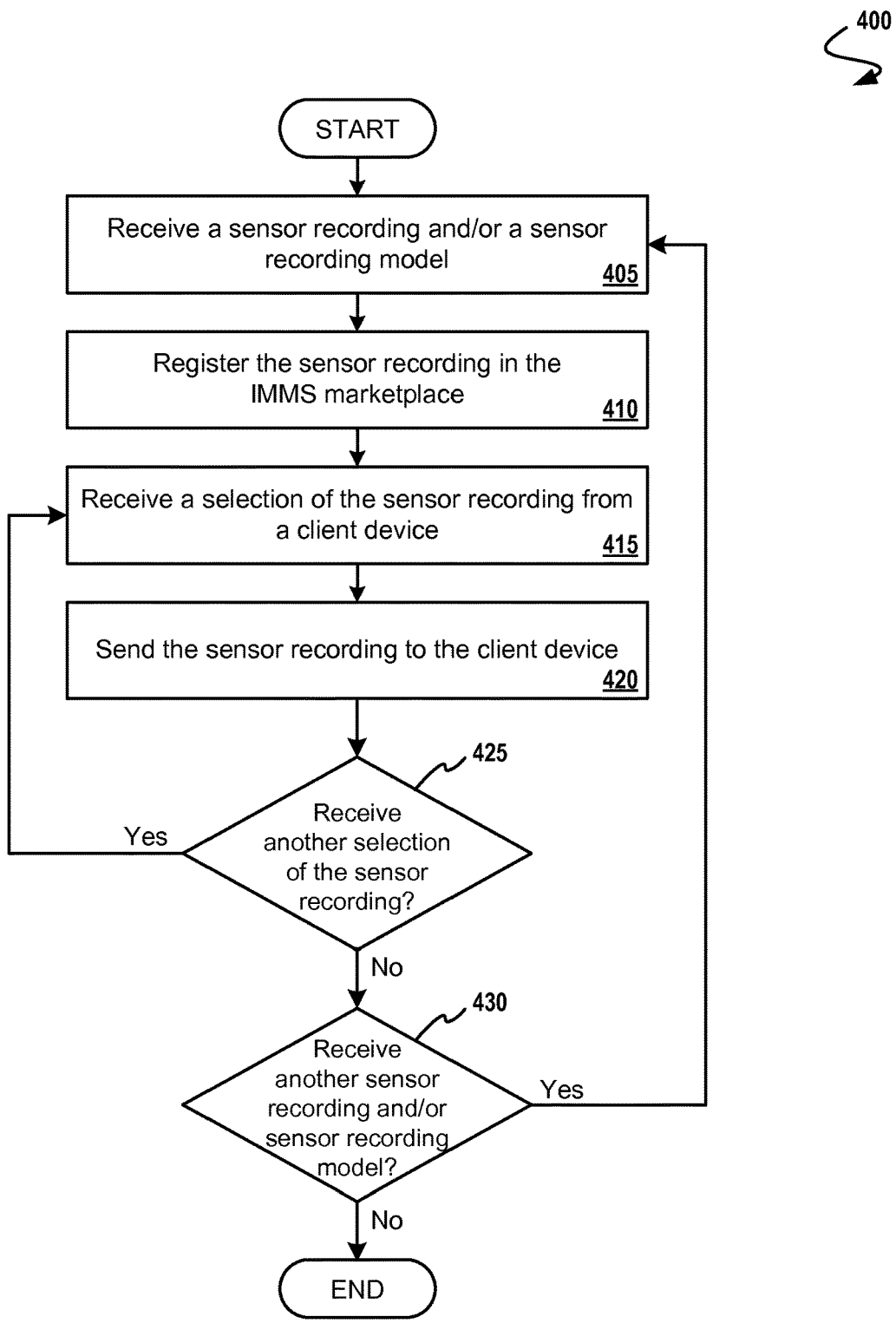
FIG. 4A is a flowchart of a method for operating a sensor recording marketplace within a cost-per-action advertising system, in accordance with some embodiments.

Method Overview for Operating an IMMS Marketplace in Cost-per-Action Advertising FIG. 4A is a flowchart of a method 400 for operating a sensor recording marketplace within in a cost-per-action system, in accordance with some embodiments. The steps of the method 400 are preferably carried out by the IMMS marketplace 108 of FIG. 1B. However, other components of the system 100 may also be involved with carrying out the steps of the method 400.

The method 400 starts in a step 405 where the method receives a sensor recording and/or a sensor recording model. The sensor recording and the sensor recording model are preferably received from a user. The method 400 then moves to a step 410 where the method registers the sensor recording in the IMMS marketplace. Next, in a step 415, the method receives a selection of the sensor recording from a client device. The method then proceeds to a step 420 where the method sends the sensor recording to the client device.

Next, in a decision operation 425, the method determines if another selection of the sensor recording is being received. If another selection of a sensor recording is being received, then the method 400 continues with the step 415 where the method receives another selection of the sensor recording from a client device. However, if the method determines in the decision operation 425 that another selection of the sensor recording is not being received, then the method 400 continues to another decision operation 430.

In the decision operation 430, the method determines if another sensor recording and/or sensor recording model is being received. If another sensor recording and/or sensor recording model is being received, then the method 400 continues with the step 405 where the method receives a sensor recording and/or sensor recording model. However, if the method determines in the decision operation 430 that another sensor recording and/or sensor recording model is not being received, then the method 400 concludes.

Note that the method 400 may include other details and steps that are not discussed in this method overview. Other details and steps are discussed with reference to the appropriate figures and may be a part of the method 400, depending on the embodiment.

Figure 4B:
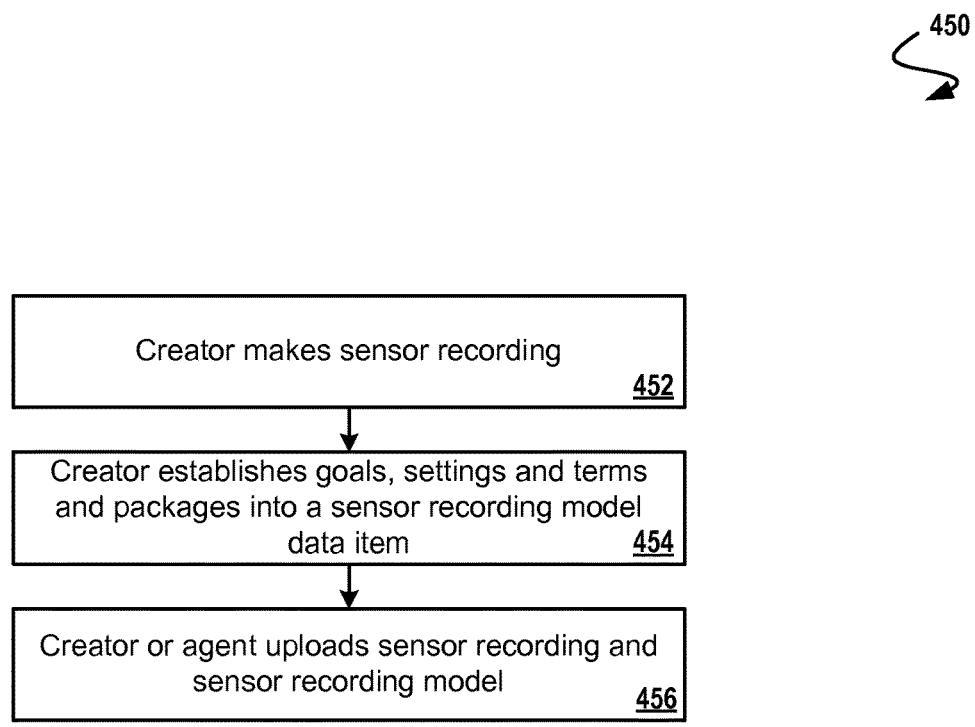
FIG. 4B is a flowchart of a method for registering a sensor recording with a sensor recording marketplace within a cost-per-action advertising system, in accordance with some embodiments.

FIG. 4B is a flowchart of a method for registering a sensor recording with a sensor recording marketplace within in a cost-per-action method, according to one embodiment. As an option, the present method 450 may be implemented in the context of the architecture and functionality of FIG. 1A through FIG. 4A. Of course, however, the method 450 or any operation therein may be carried out in any desired environment. As shown, the method 450 initiates an operation 452 for creating a sensor recording. As earlier described, a sensor recording might be created using any one or more techniques. In this embodiment, the creator optionally establishes goals, settings and terms corresponding to the sensor recording, collectively a sensor recording model data item (see operation 454). With the media resulting from one or both of operations 452, 454, operation 456 serves to facilitate uploading of the sensor recording and the sensor recording model.

Figure 4C:
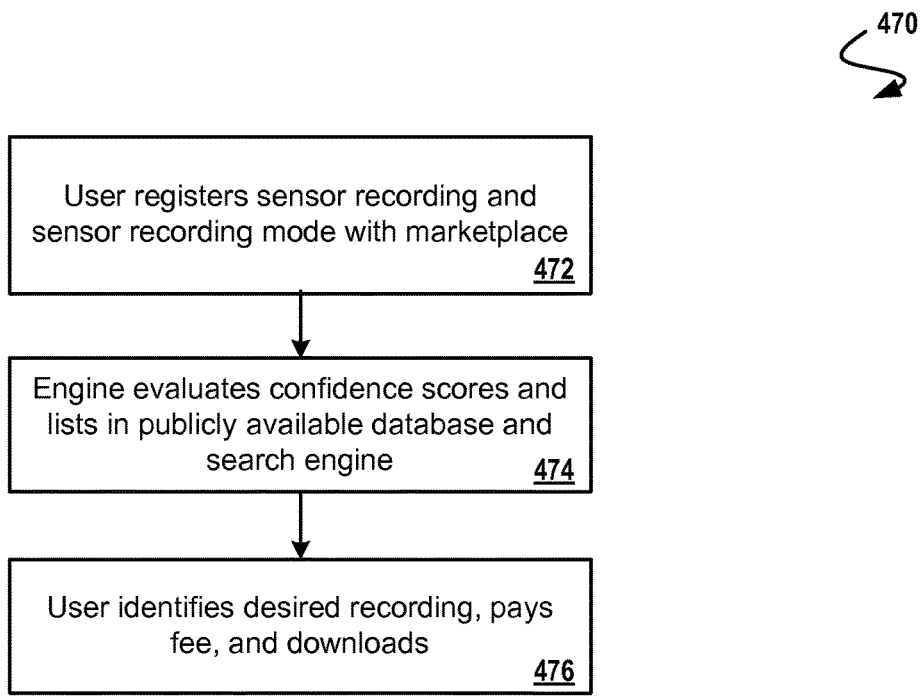
FIG. 4C is a flowchart of a method for downloading a sensor recording from a sensor recording marketplace within a cost-per-action advertising system, in accordance with some embodiments.

FIG. 4C is a flowchart of a method for downloading a sensor recording from a sensor recording marketplace within in a cost-per-action system, according to one embodiment. As an option, the present method 470 may be implemented in the context of the architecture and functionality of FIG. 1A through FIG. 4B. Of course, however, the method 470 or any operation therein may be carried out in any desired environment. As shown, the method 470 initiates an operation 472 for registering a sensor recording and sensor recording model-including associated purpose, settings and terms—with the marketkplace. In some cases, the sensor recording model is completely self-contained; in other cases, the sensor recording model might be codified or augmented (or even narrowed) through the process of registration (see operation 472), and such an operation might include codification (e.g. description via predicates) of a target audience. The operation 474 within method 470 serves for evaluating the model, possibly producing confidence scores (e.g. are there users in the database corresponding to the aforementioned target audience?). The operation 474 within method 470 also serves to explicitly identify lists of target users within the specified target audience. Such lists of target users within the specified target audience might then be used for recruiting/soliciting actions by such users. Once a user identifies a recording (with or without being recruited or explicitly solicited), operation 476 serves for downloading the desired sensor recording, possibly including transacting any fees.

Figure 4D:
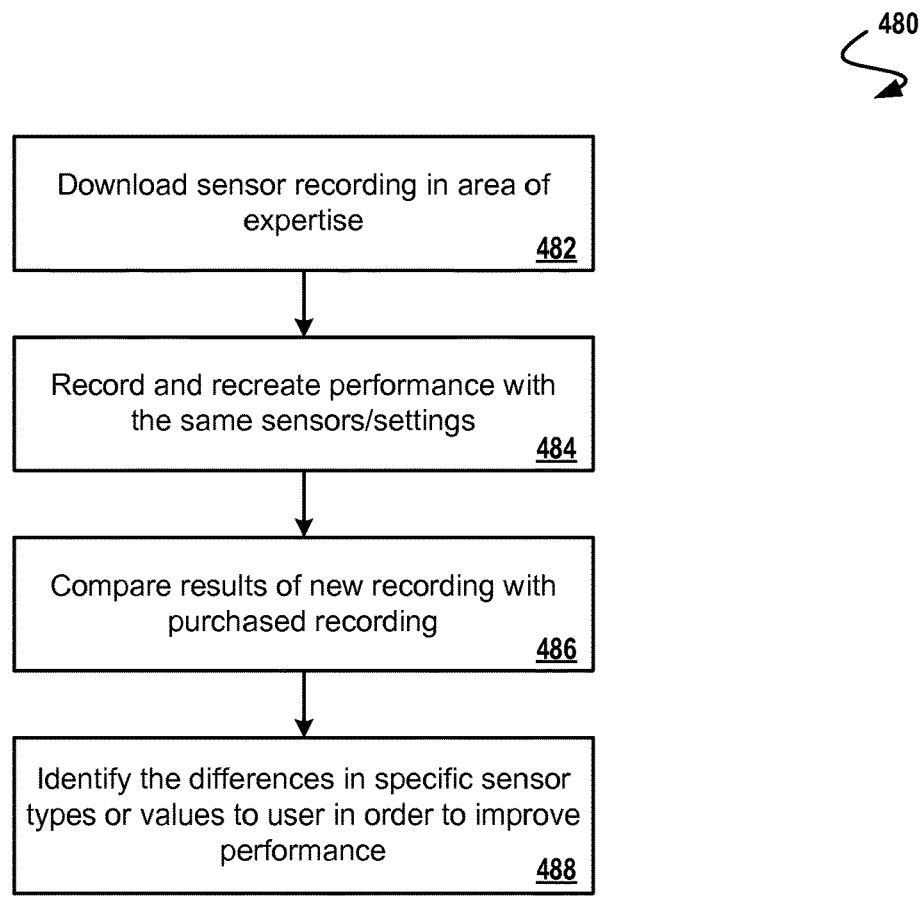
FIG. 4D is a flowchart of a method for expert operations upon a sensor recording retrieved from a sensor recording marketplace within a cost-per-action advertising system, in accordance with some embodiments.

FIG. 4D is a flowchart of a method for expert operations upon a sensor recording within a sensor recording marketplace within in a cost-per-action system, according to one embodiment. As an option, the present method 480 may be implemented in the context of the architecture and functionality of FIG. 1A through FIG. 4C. Of course, however, the method 480 or any operation therein may be carried out in any desired environment. As shown, the method 480 initiates an operation (see operation 482) for downloading a user's sensor recording in the expert's area of expertise (e.g. golf, dance, hurdles, other performance, etc). The expert might then perform or otherwise recreate a similar sensor recording using settings and configurations corresponding to the downloaded sensor recording (see operation 484). The expert might then compare the recordings (see operation 486) and offer expert advice (see operation 488) to a user for the user to improve the sensor recording and/or actual performance.

Computer-Readable Medium Implementations

Portions of some embodiments may be conveniently implemented by using a conventional general purpose or a specialized digital computer or microprocessor programmed according to the teachings of the present disclosure, as will be apparent to those skilled in the computer art. Appropriate software coding can readily be prepared by skilled programmers based on the teachings of the present disclosure. The system may also be implemented by the preparation of application-specific integrated circuits or by interconnecting an appropriate network of conventional component circuits.

Figure 5:
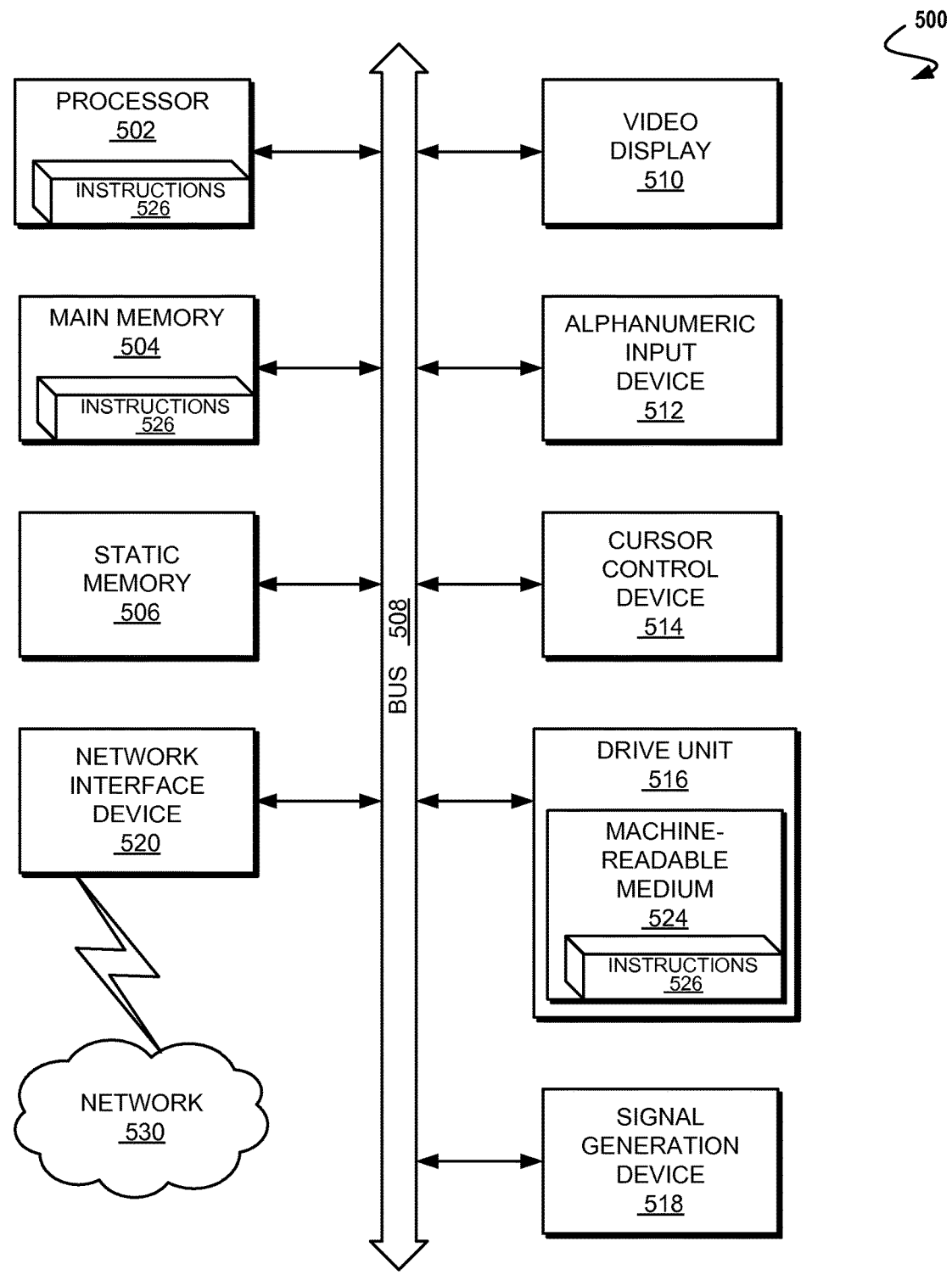
FIG. 5 is a diagrammatic representation of a machine in the exemplary form of a computer system, within which a set of instructions for causing the machine to perform any one of the methodologies discussed herein may be executed.

FIG. 5 shows a diagrammatic representation of a machine in the exemplary form of a computer system 500, within which a set of instructions for causing the machine to perform any one of the methodologies discussed herein, may be executed. The embodiment shown is purely exemplary, and might be implemented in the context of one or more of FIG. 1A through FIG. 4D. In alternative embodiments, the machine may comprise a network router, a network switch, a network bridge, a Personal Digital Assistant (PDA), a cellular telephone, a web appliance or any machine capable of executing a sequence of instructions that specify actions to be taken by that machine.

The computer system 500 includes a processor 502, a main memory 504 and a static memory 506, which communicate with each other via a bus 508. The computer system 500 may further include a video display unit 510 (e.g. a liquid crystal display or a cathode ray tube). The computer system 500 also includes an alphanumeric input device 512 (e.g. a keyboard), a cursor control device 514 (e.g. a mouse), a disk drive unit 516, a signal generation device 518 (e.g. a speaker), and a network interface device 520.

The disk drive unit 516 includes a machine-readable medium 524 on which is stored a set of instructions (i.e. software) 526 embodying any one, or all, of the methodologies described above. The software 526 is also shown to reside, completely or at least partially, within the main memory 504 and/or within the processor 502. The software 526 may further be transmitted or received via the network interface device 520 over the network.

It is to be understood that embodiments of this invention may be used as, or to support, software programs executed upon some form of processing core (such as the CPU of a computer) or otherwise implemented or realized upon or within a machine or computer-readable medium. A machine readable medium includes any mechanism for storing or transmitting information in a form readable by a machine (e.g. a computer). For example, a machine readable medium includes read-only memory (ROM); random access memory (RAM); magnetic disk storage media; optical storage media; flash memory devices; electrical, optical, acoustical or other form of propagated signals (e.g. carrier waves, infrared signals, digital signals, etc); or any other type of media suitable for storing or transmitting information.

An implementation may include a computer program product which is a storage medium (media) having instructions stored thereon/in which can be used to control, or cause, a computer to perform any of the processes of the implementation. The storage medium can include, without limitation, any type of disk including floppy disks, mini disks (MD's), optical disks, DVDs, CD-ROMs, microdrives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer-readable medium (media), some implementations include software for controlling both the hardware of the general purpose/specialized computer or microprocessor, and for enabling the computer or microprocessor to interact with a human user or other mechanism using the results of the particular embodiment. Such software may include, without limitation, device drivers, operating systems and user applications. Ultimately, such computer-readable media further includes software for performing aspects of the method, as described above.

Included in the programming (software) of the general/specialized computer or microprocessor are software modules for the processes described above. The process may include, without limitation, the following: receiving requested actions, conditions and/or terms from an advertiser; receiving at least one registration from one or more users; matching the user to the advertiser; receiving from the user a satisfaction of at least one of the requested actions, conditions and/or terms; and compensating the user.

Advantages

The system described above provides a way to micro-incentivize users on the individual actions or sub-action level and to reward users for performing actions within conditions and/or associated terms. The system allows users to perform verifiable actions that are highly valuable for an advertiser and to then be rewarded for their efforts. The system allows users to opt-in and opt-out of the system at any time. The system allows advertisers to receive recommendations based on user actions performed over a period of time.

The system allows users to receive compensation for performing requested actions, conditions and/or terms provided by advertisers or other users. Advertisers and/or system operators have an interface for specifying the terms upon which a requested action may be satisfied. Accordingly, the system also allows advocate users to engage other users on behalf of advertisers with respect to a product, service, brand or other information. The system encourages users to perform high-value actions by providing compensation to users who perform certain actions. The system keeps track of and maintains high-value actions of users.

The system adds another facet for users or advertisers to attract consumers through sensor recordings. The system allows users or advertisers to market, generate and/or bid on sensor recordings from other users or advertisers. The system also allows users, advertisers and/or system operators to locate and monetize on user-generated sensor recordings.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for matching users with experts in response to a recording of a series of events by the user, the method comprising:
   receiving from a user, by one or more computers, a kinesthetic sensor recording comprising performance motion information of the user recorded by the user that pertains to the series of events and a respective sensor recording model, the sensor recording model comprises meta-information about the kinesthetic sensor recording, and terms-of-use associated with the kinesthetic sensor recording, wherein the sensor recording model comprises a requested action of a user-generated sensor recording request;
   registering the kinesthetic sensor recording and the respective sensor recording model in the sensor recording marketplace, wherein the sensor recording marketplace, operated as a network, matches the kinesthetic sensor recording by the user to at least one expert;
   matching, by the one or more computers, the respective sensor recording model to at least one expert by using the meta information in the sensor recording model to associate the series of events to the product or service of the expert;
   sending the kinesthetic sensor recording to the expert the expert then providing analysis and direction without being physically with the user;
   providing, in the sensor recording marketplace, facilities, including at least a public directory and a series of specific syntax rules, that enable one user to select, experience, and optionally purchase kinesthetic sensor recordings made by another user, wherein the specific syntax rules facilitate expressing characteristics of the kinesthetic sensor recordings, and wherein the characteristics include input sensor type and one or more kinesthetic sensor recording objectives, values, goals, or offers;
   evaluating a particular kinesthetic sensor recording to generate a confidence score that indicates a likelihood of one or more users selecting the particular kinesthetic sensor recording, wherein a confidence evaluation includes comparing historical records, current sensor sources, and current user data sources, and
   for every recording offered through the sensor recording marketplace, ranking each user according to their likelihood to purchase the recording.

2. The method of claim 1, wherein the performance motion information is related to a sports activity or motor skill.

3. A non-transitory computer-readable medium carrying one or more instructions for matching users with experts in response to a recording of a series of events by the user, wherein the one or more instructions, when executed by one or more processors, cause the one or more processors to perform the steps of:
   receiving from a user, by one or more computers, a kinesthetic sensor recording comprising performance motion information of the user recorded by the user that pertains to the series of events and a respective sensor recording model, the sensor recording model comprises meta-information about the kinesthetic sensor recording, and terms-of-use associated with the kinesthetic sensor recording, and wherein the sensor recording model comprises a requested action of a user-generated sensor recording request;
   registering the kinesthetic sensor recording and the respective sensor recording model in the sensor recording marketplace, wherein the sensor recording marketplace, operated as a network, matches the kinesthetic sensor recording by the user to at least one expert;
   matching, by the one or more computers, the respective sensor recording model to at least one expert by using the meta information in the sensor recording model to associate the series of events to the product or service of the expert;
   sending the kinesthetic sensor recording to the expert the expert then providing analysis and direction without being physically with the user;
   providing, in the sensor recording marketplace, facilities, including at least a public directory and a series of specific syntax rules, that enable one user to select, experience, and optionally purchase kinesthetic sensor recordings made by another user, wherein the specific syntax rules facilitate expressing characteristics of the kinesthetic sensor recordings, and wherein the characteristics include input sensor type and one or more kinesthetic sensor recording objectives, values, goals, or offers;
   evaluating a particular kinesthetic sensor recording to generate a confidence score that indicates a likelihood of one or more users selecting the particular kinesthetic sensor recording, wherein a confidence evaluation includes comparing historical records, current sensor sources, and current user data source; and
   for every recording offered through the sensor recording marketplace, ranking each user according to their likelihood to purchase the recording.

4. The non-transitory computer-readable medium of claim 3, wherein the performance motion information is related to a sports activity or motor skill.

5. A system for matching users with experts in response to a recording of a series of events using a sensor recording marketplace, the system comprising:
- a computer processor to execute a set of program code instructions; and
- a memory to hold the program code instructions, in which the program code instructions comprises program code to perform,
- receiving from a user, by one or more computers, a kinesthetic sensor recording comprising performance motion information of the user recorded by the user that pertains to the series of events and a respective sensor recording model, the sensor recording model comprises meta-information about the kinesthetic sensor recording, and terms-of-use associated with the kinesthetic sensor recording, and wherein the sensor recording model comprises a requested action of a user-generated sensor recording request;
- registering the kinesthetic sensor recording and the respective sensor recording model in the sensor recording marketplace, wherein the sensor recording marketplace, operated as a network, matches the kinesthetic sensor recording by the user to at least one expert;
- matching, by the one or more computers, the respective sensor recording model to at least one expert by using the meta information in the sensor recording model to associate the series of events to the product or service of the expert;
- sending the kinesthetic sensor recording to the expert the expert then providing analysis and direction without being physically with the user;
- providing, in the sensor recording marketplace, facilities, including at least a public directory and a series of specific syntax rules, that enable one user to select, experience, and optionally purchase kinesthetic sensor recordings made by another user, wherein the specific syntax rules facilitate expressing characteristics of the kinesthetic sensor recordings, and wherein the characteristics include input sensor type and one or more kinesthetic sensor recording objectives, values, goals, or offers;
- evaluating a particular kinesthetic sensor recording to generate a confidence score that indicates a likelihood of one or more users selecting the kinesthetic sensor recording, wherein a confidence evaluation includes comparing historical records, current sensor sources, and current user data sources, and for every recording offered through the sensor recording marketplace, ranking each user according to their likelihood to purchase the recording.

6. The system of claim 5, wherein the performance motion information is related to a sports activity or motor skill.

* * * * *